(12) United States Patent
Esswie

(10) Patent No.: US 12,513,693 B2
(45) Date of Patent: Dec. 30, 2025

(54) DYNAMIC UPLINK DEVICE AGGREGATION

(71) Applicant: Dell Products, L.P., Round Rock, TX (US)

(72) Inventor: Ali Esswie, Montreal (CA)

(73) Assignee: Dell Products L.P., Round Rock, TX (US)

( * ) Notice: Subject to any disclaimer, the term of this patent is extended or adjusted under 35 U.S.C. 154(b) by 327 days.

(21) Appl. No.: 18/069,122

(22) Filed: Dec. 20, 2022

(65) Prior Publication Data
US 2024/0205915 A1    Jun. 20, 2024

(51) Int. Cl.
  *H04W 72/1268*    (2023.01)
  *H04W 76/19*    (2018.01)

(52) U.S. Cl.
  CPC ....... *H04W 72/1268* (2013.01); *H04W 76/19* (2018.02)

(58) Field of Classification Search
  CPC .......................... H04W 72/1268; H04W 76/19
  See application file for complete search history.

(56) References Cited

U.S. PATENT DOCUMENTS

| | | | |
|---|---|---|---|
| 2010/0322165 A1* | 12/2010 | Yoo | H04L 1/0073 370/329 |
| 2018/0069618 A1 | 3/2018 | Loehr et al. | |
| 2018/0103395 A1 | 4/2018 | Gholmieh et al. | |
| 2018/0324882 A1 | 11/2018 | Gulati et al. | |
| 2019/0082459 A1 | 3/2019 | Faurie et al. | |
| 2019/0208539 A1* | 7/2019 | Christoffersson | H04L 1/0045 |
| 2020/0092685 A1 | 3/2020 | Fehrenbach et al. | |
| 2020/0106590 A1 | 4/2020 | Bharadwaj et al. | |
| 2020/0322948 A1* | 10/2020 | Xue | H04W 74/0833 |
| 2021/0144582 A1 | 5/2021 | Yi et al. | |

(Continued)

FOREIGN PATENT DOCUMENTS

| | | |
|---|---|---|
| CN | 104 185 290 | 12/2014 |
| WO | 2021/236786 | 11/2021 |

OTHER PUBLICATIONS

Technical specifications (TS) 38.201—"5G; NR; Physical layer; General description", 3GPP TS 38.201 version 15.0.0 Release 15, Sep. 2018, 14 pages.

(Continued)

*Primary Examiner* — Kenny S Lin
(74) *Attorney, Agent, or Firm* — Amin, Turocy & Watson, LLP

(57) ABSTRACT

A primary user equipment transmits an aggregated connection request message to a serving radio access network node requesting uplink connection information corresponding to one or more user equipment of an aggregation group. The node determines and transmits to the primary user equipment uplink connection information for user equipment of the aggregation group to use in establishing a connection to the node. The primary user equipment transmits, individually, respective uplink connection information to the secondary user equipment devices. A primary user equipment may aggregate uplink traffic received from secondary user equipment along with multiple medium access control control elements into an aggregation payload message and transmit the aggregation payload message in a single transport block to the node.

20 Claims, 17 Drawing Sheets

(56) References Cited

U.S. PATENT DOCUMENTS

| | | | |
|---|---|---|---|
| 2021/0298043 A1* | 9/2021 | He | H04W 28/0278 |
| 2022/0030618 A1* | 1/2022 | Wang | H04W 72/569 |
| 2022/0060858 A1 | 2/2022 | Manithara Vamanan et al. | |
| 2022/0110141 A1 | 4/2022 | Kwak et al. | |
| 2022/0210698 A1 | 6/2022 | Ly et al. | |
| 2023/0199607 A1 | 6/2023 | Adjakple et al. | |
| 2024/0147546 A1* | 5/2024 | Ly | H04L 1/189 |
| 2024/0188121 A1 | 6/2024 | Yang et al. | |
| 2024/0205730 A1 | 6/2024 | Esswie | |
| 2024/0306238 A1* | 9/2024 | Shi | H04W 76/19 |

OTHER PUBLICATIONS

Technical specifications (TS) 38.331—"5G; NR; Radio Resource Control (RRC); Protocol specification", 3GPP TS 38.331 version 16.1.0 Release 16, Jul. 2020, 886 pages.

Technical specifications (TS) 38.211—"5G; NR; Physical channels and modulation", 3GPP TS 38.211 version 16.2.0 Release 16, Jul. 2020, 136 pages.

Technical specifications (TS) 38.304—"5G; NR; User Equipment (UE) procedures in idle mode and in RRC Inactive state", 3GPP TS 38.304 version 16.1.0 Release 16, Jul. 2020, 41 pages.

Technical specifications (TS) 38.300—"5G; NR; NR and NG-RAN Overall description; Stage-2" 3GPP TS 38.300 version 16.4.0 Release 16, Jan. 2021, 151 pages.

International Search Report and Written Opinion mailed Feb. 12, 2024 for PCT Application No. PCT/US2023/035954, 17 pages.

International Search Report and Written Opinion mailed Feb. 16, 2024 for PCT Application No. PCT/US2023/035956, 16 pages.

Esswie, Ali. "Dynamic Uplink Device Aggregation" U.S. Appl. No. 18/069,152 filed Dec. 20, 2022, 93 pages.

Office Action mailed May 13, 2025 for U.S. Appl. No. 18/069,152, 59 pages.

Notification concerning transmittal of International Preliminary Report on Patentability mailed Jul. 3, 2025 for PCT Application No. PCT/US2023/035956, 10 pages.

Notification concerning transmittal of International Preliminary Report on Patentability mailed Jul. 3, 2025 for PCT Application No. PCT/US2023/035954, 11 pages.

Notice of Allowance mailed Sep. 3, 2025 for U.S. Appl. No. 18/069,152, 23 pages.

* cited by examiner

1305: A non-transitory machine-readable medium, comprising executable instructions that, when executed by a processor of a first user equipment, facilitate performance of operations, comprising: receiving, from a second user equipment, a second-user-equipment-associated buffer status report indicative of a first size of a first uplink traffic portion at a second user equipment

1310: receiving, from a third user equipment, a third-user-equipment-associated buffer status report indicative of a second size of a second uplink traffic portion at a third user equipment

1315: generating a first-user-equipment-associated buffer stratus report based on the second-user-equipment-associated buffer status report and the third-user-equipment-associated buffer status report

1320: transmitting, to a radio access network node, the first-user-equipment-associated buffer stratus report

1325: receiving, the first uplink traffic portion and the second uplink traffic portion from the second user equipment and the third user equipment, respectively

1330: generating, an aggregation payload message comprising the first uplink traffic and the second uplink traffic, wherein the aggregation payload message comprises a first medium access control control element indicative of the first uplink traffic portion within the aggregation payload message and a second medium access control control element indicative of the second uplink traffic portion within the aggregation payload message

1335: receiving, from the radio access network node, an uplink resource grant message comprising at least one uplink resource indication indicative of at least one uplink resource to be used to transmit, by the first user equipment, a first-user-equipment-associated-amount of uplink traffic corresponding to the first-user-equipment-associated buffer stratus report

1340: transmitting, to the radio access network node, the aggregation payload message according to the at least one uplink resource

1345: wherein the first user equipment, the second user equipment, and the third user equipment are members of an aggregation group

DYNAMIC UPLINK DEVICE AGGREGATION

BACKGROUND

The 'New Radio' (NR) terminology that is associated with fifth generation mobile wireless communication systems ("5G") refers to technical aspects used in wireless radio access networks ("RAN") that comprise several quality-of-service classes (QoS), including ultrareliable and low latency communications ("URLLC"), enhanced mobile broadband ("eMBB"), and massive machine type communication ("mMTC"). The URLLC QoS class is associated with a stringent latency requirement (e.g., low latency or low signal/message delay) and a high reliability of radio performance, while conventional eMBB use cases may be associated with high-capacity wireless communications, which may permit less stringent latency requirements (e.g., may permit higher latency than URLLC) and less reliable radio performance as compared to URLLC. Performance requirements for mMTC may be lower than for eMBB use cases. Some use case applications involving mobile devices or mobile user equipment such as smart phones, wireless tablets, smart watches, and the like, may impose on a given RAN resource loads, or demands, that vary.

Sidelink communications may facilitate a variety of cellular use-cases such as autonomous vehicle crash avoidance, public avoidance, coordinated vehicle cruise control, and the like, where devices become able to communicate and coordinate directly with each other without communication messaging and signaling going through the RAN network. This is particularly important in cases where some of or all user equipment that coordinate as part of a sidelink group are located beyond RAN wireless coverage. User equipment devices may also communicate with one another via other means, such as, for example, Wi-Fi, Bluetooth, and the like.

SUMMARY

The following presents a simplified summary of the disclosed subject matter in order to provide a basic understanding of some of the various embodiments. This summary is not an extensive overview of the various embodiments. It is intended neither to identify key or critical elements of the various embodiments nor to delineate the scope of the various embodiments. Its sole purpose is to present some concepts of the disclosure in a streamlined form as a prelude to the more detailed description that is presented later.

In an example embodiment, a method comprises transmitting, by a first user equipment comprising a processor to a radio access network node (e.g., a RAN), an uplink aggregation request message comprising user equipment access information corresponding to a second user equipment. The user equipment access information may comprise information that a user equipment may transmit to a RAN to establish RRC connection with the RAN. The first user equipment may be a primary user equipment, or a relay user equipment, in an aggregation group of user equipment device. The method may further comprise receiving, by the first user equipment from the radio access network node responsive to the uplink aggregation request message, an uplink aggregation grant message comprising uplink grant information corresponding to the second user equipment. The uplink grant information may comprise information that a RAN may provide to a user equipment during an RRC connection establishment process, for example, one or indications of one or more time or frequency resource grants.

The example method may further comprise transmitting, by the first user equipment to the second user equipment, a first uplink grant message comprising the uplink grant information corresponding to the second user equipment.

The user equipment access information corresponding to the second user equipment may be first user equipment access information, and the uplink aggregation request message may comprise second user equipment access information corresponding to a third user equipment. The uplink grant information corresponding to the second user equipment may be first uplink grant information, and the uplink aggregation grant message may comprise second uplink grant information corresponding to the third user equipment. The first user equipment, the second user equipment, and the third user equipment may be members of an aggregation group of user equipment. The example method may further comprise transmitting, by the first user equipment to the third user equipment, a second uplink grant message comprising the second uplink grant information.

The uplink aggregation request message may be transmitted by the first user equipment to the radio access network node via an uplink control channel as an uplink control channel information message. This embodiment may be used if the first user equipment is already in an RRC connected state vis-a-vis a serving RAN.

In an embodiment, the example method may further comprise determining, by the first user equipment, that the uplink aggregation request message is larger than a configured uplink control channel indication criterion, such as a configured size limit in terms of bits, bytes, or packets of uplink control channel message traffic imposed by a RAN, wherein the uplink aggregation request message is transmitted by the first user equipment to the radio access network node via an uplink data channel based on the uplink aggregation request message being determined to be larger than the configured uplink control channel indication criterion.

In an embodiment, the method may further comprise determining, by the first user equipment, a serving beam, corresponding to the first user equipment from multiple available beams, having a highest signal strength at the first user equipment, wherein the uplink aggregation request message is transmitted via the serving beam corresponding to the first user equipment.

In another embodiment, the uplink aggregation request message may comprise a random access preamble corresponding to the first user equipment. The random access preamble may comprise a group preamble that has been assigned to am aggregation group.

The user equipment access information may comprise a determined serving downlink beam index, a target service identifier, or a device identifier corresponding to the second user equipment. The user equipment access information may be determined by the second user equipment.

The uplink grant information may comprise a first uplink channel resource grant indication indicative of a first uplink channel resource grant to be used by the first user equipment to transmit first uplink data traffic corresponding to the first user equipment and a second uplink channel resource grant indication indicative of a second uplink channel resource grant to be used by the second user equipment to transmit second uplink data traffic corresponding to the second user equipment. The first or second uplink channel resource grants may comprise time or frequency resources.

In an embodiment, the first user equipment and the second user equipment may be members of an aggregation group, wherein the first user equipment is a relay user equipment of the aggregation group, wherein the second user equipment is a remote user equipment of the aggregation group, wherein the aggregation group comprises a third user equipment that is a remote user equipment, and wherein the user equipment access information comprises a preamble that indicates to the radio access network node a request that the uplink aggregation grant message comprise uplink grant information corresponding to the second user equipment and the third user equipment.

In another embodiment, a relay user equipment may comprise a processor that is configured to receive, from a first tethered user equipment tethered to the relay user equipment, first access information corresponding to the first tethered user equipment, and transmit, to a radio access network node, an uplink radio resource connection aggregation request message comprising the first access information. The first access information may be directed to be used to establish a radio resource control connection between the first tethered user equipment and the radio access network node. The processor may be configured to receive, from the radio access network node responsive to the uplink radio resource connection aggregation request message, an uplink aggregation grant message comprising first uplink grant information to be used by the first tethered user equipment to transmit first uplink data traffic from the first tethered user equipment to the radio access network node, and transmit, to the first tethered user equipment, a first uplink grant message comprising the first uplink grant information.

The uplink radio resource connection aggregation request message comprises a preamble that can be used to establish a radio resource control connection between the relay user equipment and the radio access network node. The uplink radio resource connection aggregation request message may indicate to a serving RAN that RRC connection requests for members of an aggregation group are being requested. The preamble may comprise a group PRACH—upon receiving a group PRACH from a primary/relay user equipment, the RAN may be configured to recognize the PRACH preamble as an indication of a request from the primary/relay user equipment for aggregation of the sending of RRC grants for an aggregation group of user equipment and may automatically send the uplink aggregation grant message.

The relay user equipment and the first tethered user equipment may be members of an aggregation group, wherein the uplink radio resource connection aggregation request message comprises relay access information to be used to establish a radio resource control connection between the relay user equipment and the radio access network node, and wherein the uplink aggregation grant message comprises relay uplink grant information to be used by the relay user equipment to transmit uplink data traffic from the relay user equipment to the radio access network node. The aggregation group may comprise a second tethered user equipment and the processor of the relay user equipment may be further configured to receive, from the second tethered user equipment, second access information corresponding to the second tethered user equipment. The uplink radio resource connection aggregation request message may comprise the second access information, and the second access information is to be used to establish a radio resource control connection between the second tethered user equipment and the radio access network node. The uplink aggregation grant message may comprise second uplink grant information to be used by the second tethered user equipment to transmit second uplink data traffic from the second tethered user equipment to the radio access network node. The processor of the relay user equipment may be further configured to transmit, to the second tethered user equipment, a second uplink grant message comprising the second uplink grant information.

The uplink aggregation grant message comprise a Null uplink grant indication indicating that the second tethered user equipment has not been granted an uplink resource to transmit uplink data traffic from the second tethered user equipment to the radio access network node. The processor of the relay user equipment may be further configured to transmit, to the second tethered user equipment, a second uplink grant message comprising the Null uplink grant indication.

In another embodiment, a non-transitory machine-readable medium may comprise executable instructions that, when executed by a processor of a first user equipment, facilitate performance of operations that may comprise receiving, from a radio access network node, a group access preamble that corresponds to an aggregation group that comprises the first user equipment, a second user equipment, and a third user equipment. The operations may further comprise transmitting to a radio access network node, an uplink radio resource connection request message comprising the group access preamble, first access information to be used to establish radio resource control connection between the radio access network node and the second user equipment and second access information to be used to establish radio resource control connection between radio access network node and the third user equipment, respectively. The operations may further comprise receiving, from the radio access network node responsive to the uplink radio resource connection request message, an uplink grant message comprising first uplink grant information, second uplink grant information, and relay grant information. The operations may further comprise transmitting, to the second user equipment, a first uplink grant message comprising the first uplink grant information; and transmitting, to the third user equipment, a second uplink grant message comprising the second uplink grant information. In an embodiment, the first uplink grant information or the second uplink grant information comprises a Radio Network Temporary Identifier that is a Null indication.

The first access information may comprise at least one of: a first device identifier associated with the second user equipment, a first best-serving downlink beam corresponding to the second user equipment, or a first service identifier corresponding to a first service to be received by the second user equipment from the radio access network node. The second access information may comprise at least one of: a second device identifier associated with the third user equipment, a second best-serving downlink beam corresponding to the third user equipment, or a second service identifier corresponding to a second service to be received by the third user equipment from the radio access network node.

The first uplink grant information may comprise at least one of: a first Radio Network Temporary Identifier corresponding to the second user equipment, a first uplink time to be used by the second user equipment transmit uplink data traffic to the radio access network node, a first uplink frequency to be used by the second user equipment transmit uplink data traffic to the radio access network node, or a first uplink power control setting corresponding to a first spectral efficiency of the second user equipment.

In an embodiment, the first user equipment may be in a Connected Radio Resource Control state and may transmit the uplink radio resource connection request message via an uplink control channel as an uplink control channel information message. The second user equipment and the third user equipment may be in an Inactive Radio Resource Control state when the first user equipment transmits the uplink radio resource connection request message via an uplink control channel.

In another embodiment, an example method may comprise generating, by a first user equipment comprising a processor, an aggregated uplink traffic indication, wherein the aggregated uplink traffic indication is indicative of an aggregated uplink traffic amount that comprises a first amount of a first uplink traffic portion of first uplink traffic at a second user equipment and a second amount of a second uplink traffic portion of second uplink traffic at a third user equipment, and transmitting, by the first user equipment to a radio access network node (e.g., RAN), the aggregated uplink traffic indication The aggregated uplink traffic indication may be referred to as an aggregated buffer status report. The method may further comprise receiving, by the first user equipment, the first uplink traffic portion and the second uplink traffic portion. The method may further comprise generating, by the first user equipment, an aggregation payload message, wherein the aggregation payload message comprises the first uplink traffic portion and the second uplink traffic portion, and wherein the aggregation payload message comprises a first control element corresponding to the first uplink traffic portion and a second control element corresponding to the second uplink traffic portion. The method may further comprise transmitting, by the first user equipment to the radio access network node, the aggregation payload message. The aggregation payload message may be transmitted via a single transport block.

The example method may further comprise receiving, by the first user equipment, first user equipment information corresponding to the second user equipment. The method may further comprise receiving, by the first user equipment, second user equipment information corresponding to the third user equipment, wherein the first user equipment information comprises first buffer status report information indicative of the first uplink traffic portion in a first buffer of the second user equipment and wherein the second user equipment information comprises second buffer status report information indicative of the second uplink traffic portion in a second buffer of the third user equipment.

The first user equipment information may be received from the second user equipment or the second user equipment information may received from the third user equipment.

The first user equipment, the second user equipment, and the third user equipment may be members of an aggregation group of user equipment devices. In the aggregation group, the first user equipment may be a relay user equipment and the second or third user equipment may be remote user equipment that are connected to the relay user equipment via sidelink links, Bluetooth links, Wi-Fi link, or other types of short-range wireless communication links.

In an embodiment, the first user equipment may comprise a first buffer. The method may further comprise determining, by the first user equipment, a free amount of the first buffer. The method may further comprise receiving, from a fourth user equipment, a join request message requesting inclusion of the fourth user equipment in the aggregation group, wherein the join request message comprises first user equipment information comprising first buffer status report information indicative of a third amount of a third uplink traffic portion of third uplink traffic at the fourth user equipment. The method may further comprise determining that the free amount of the first buffer is insufficient to store the third uplink traffic portion. The method may further comprise transmitting a join decline message to the fourth user equipment indicating that the first user equipment has declined to include the fourth user equipment in the aggregation group.

The first control element and the second control element may be a first medium access control control element ("MAC-CE") and a second medium access control control element, respectively. The first control element may be indicative of a first aggregation portion of the aggregation payload message that comprises the first uplink traffic portion, and the second control element may be indicative of a second aggregation portion of the aggregation payload message that comprises the second uplink traffic portion.

In an embodiment the example method may comprise receiving, by the first user equipment from the radio access network node, an uplink resource grant message comprising at least one uplink resource indication indicative of at least one uplink resource to be used to transmit, by the first user equipment to the radio access network node, the first uplink traffic portion and the second uplink traffic portion, wherein the at least one uplink resource is based on the aggregated uplink traffic indication, and wherein the first user equipment transmits the aggregation payload message according to the at least one uplink resource. The uplink resource grant message may comprise a time or a frequency to be used to transmit a transport block that comprises the aggregation payload message.

The first control element may be indicative of a first uplink resource of the at least one uplink resource used to transmit a first aggregation portion of the aggregation payload message that comprises the first uplink traffic portion, and the second control element is indicative of a second uplink resource of the at least one uplink resource used to transmit a second aggregation portion of the aggregation payload message that comprises the second uplink traffic portion. A first or second traffic portion may comprise one or more packets, a frame, a file, or a portion thereof.

The first uplink resource and the second uplink resource may be different. The first uplink resource and the second uplink resource may be the same.

The example method may further comprise determining, by the first user equipment, a determined aggregation amount corresponding to the aggregated uplink traffic amount. The method may further comprise determining, based on the determined aggregation amount, a determined transport block size to use for transmitting the aggregation payload message. The aggregation payload message may be transmitted by the first user equipment using a transport block having the determined transport block size. The first user equipment may determine the determined transport block size from a configured set of transport block sizes. A transport block configuration of the configured set of transport block sizes may be received by the first user equipment from the RAN. Different transport block sizes may be associated with ranges of traffic portions sizes. Accordingly, the first user equipment may select from the transport block configuration, or determine therefrom, the determined transport block size such that the aggregation payload message satisfies a range that corresponds to a transport block that has a smallest size of the set of transport block sizes that can accommodate the aggregation payload message.

In an embodiment, the first uplink traffic portion may be received from the second user equipment via a sidelink channel link or the second uplink traffic portion may be received from the third user equipment via a sidelink channel link.

In another embodiment, a relay user equipment may comprise a processor that is configured to receive, from a first remote user equipment, first user equipment information indicative of a first amount of a first uplink traffic portion of first uplink traffic in a first buffer of the first remote user equipment and receive, from a second remote user equipment, second user equipment information indicative of a second amount of a second uplink traffic portion of second uplink traffic in a second buffer at the second remote user equipment. The first remote user equipment, the second remote user equipment, and the relay user equipment may be members of an aggregation group of user equipment. The processor of the relay user equipment may be further configured to generate an aggregated uplink traffic indication indicative of an aggregated uplink traffic amount that comprises the first amount of the first uplink traffic portion and the second amount of the second uplink traffic portion and transmit, to a radio access network node (e.g., RAN), the aggregated uplink traffic indication. The processor of the relay user equipment may be further configured to receive the first uplink traffic portion and the second uplink traffic. The processor of the relay user equipment may be configured to generate, an aggregation payload message comprising the first uplink traffic portion and the second uplink traffic portion, wherein the aggregation payload message comprises a first control element corresponding to the first uplink traffic portion and a second control element corresponding to the second uplink traffic portion. The relay user equipment may be configured to receive, from the radio access network node, an uplink resource grant message comprising at least one uplink resource indication indicative of at least one uplink resource to be used to transmit the first uplink traffic portion and the second uplink traffic portion, and transmit, to the radio access network node, the aggregation payload message according to the at least one uplink resource.

The at least one uplink resource may be based on the aggregated uplink traffic indication. The RAN may determine or schedule the at least one uplink resource based on the size, type, or quality-of-service, of the uplink traffic indicated by the aggregated uplink traffic indication.

The first control element and the second control element may be a first medium access control control element and a second medium access control control element, respectively. The first control element may be indicative of a first aggregation portion (e.g., a packet, a block, a frame, a file, or a complete traffic flow) of the aggregation payload message that comprises the first uplink traffic portion, and wherein the second control element is indicative of a second aggregation portion of the aggregation payload message that comprises the second uplink traffic portion.

The processor of the relay user equipment may be further configured to determine a determined aggregation amount corresponding to a traffic amount of aggregated uplink traffic amount, and determine, based on the determined aggregation amount, a determined transport block size to use for transmitting the aggregation payload message. The aggregation payload message may be transmitted by the relay user equipment using a transport block having the determined transport block size.

In yet another embodiment, a non-transitory machine-readable medium example may comprise executable instructions that, when executed by a processor of a first user equipment, facilitate performance of operations, comprising: receiving, from a second user equipment, a second-user-equipment-associated buffer status report indicative of a first size of a first uplink traffic portion at a second user equipment. The operations may further comprise receiving, from a third user equipment, a third-user-equipment-associated buffer status report indicative of a second size of a second uplink traffic portion at a third user equipment. The operations may further comprise generating a first-user-equipment-associated buffer stratus report based on the second-user-equipment-associated buffer status report and the third-user-equipment-associated buffer status report. The operations may further comprise transmitting, to a radio access network node, the first-user-equipment-associated buffer stratus report. The operations may further comprise receiving the first uplink traffic portion and the second uplink traffic portion from the second user equipment and the third user equipment, respectively. The operations may further comprise generating, an aggregation payload message comprising the first uplink traffic and the second uplink traffic. The operations may further comprise generating a first medium access control control element, indicative of the first uplink traffic portion within the aggregation payload message and a second medium access control control element indicative of the second uplink traffic portion within the aggregation payload message. The aggregation payload message may comprise the first medium access control control element and the second medium access control control element. The operations may further comprise receiving, from the radio access network node, an uplink resource grant message comprising at least one uplink resource indication indicative of at least one uplink resource to be used to transmit, by the first user equipment, a first-user-equipment-associated-amount of uplink traffic corresponding to the first-user-equipment-associated buffer stratus report. The operations may further comprise transmitting, to the radio access network node, the aggregation payload message according to the at least one uplink resource, wherein the first user equipment, the second user equipment, and the third user equipment are members of an aggregation group.

In an embodiment, the operations may further comprise determining a size of the aggregation payload message, resulting in a determined size. The operations may further comprise determining, based on the determined size of the aggregation payload message, a determined transport block size to use for transmitting the aggregation payload message, wherein the determined size of the aggregation payload message satisfies a transport block size criterion (e.g., a range of traffic portion size) that corresponds to the determined transport block size. The operations may further comprise transmitting the aggregation payload message by the first user equipment using a transport block having the determined transport block size.

In an embodiment, the first medium access control control element is adjacent to the first uplink traffic portion within the aggregation payload message, and wherein the second medium access control control element is adjacent to the second uplink traffic portion within the aggregation payload message. The first or second medium access control control elements may precede or follow the first or second traffic portions to which they correspond. In an embodiment, the first and second medium access control control elements may comprise first and second traffic portion sizes that correspond to the first and second traffic portions and may be placed in a Medium Access Control Control Element portion of the transport block that facilitates the RAN in retrieving the first and second traffic portion sizes from the transport block in which the aggregation payload message is transmitted.

BRIEF DESCRIPTION OF THE DRAWINGS

FIG. 13 illustrates a block diagram of an example non-transitory machine-readable medium.

DETAILED DESCRIPTION OF THE DRAWINGS

Figure 1:
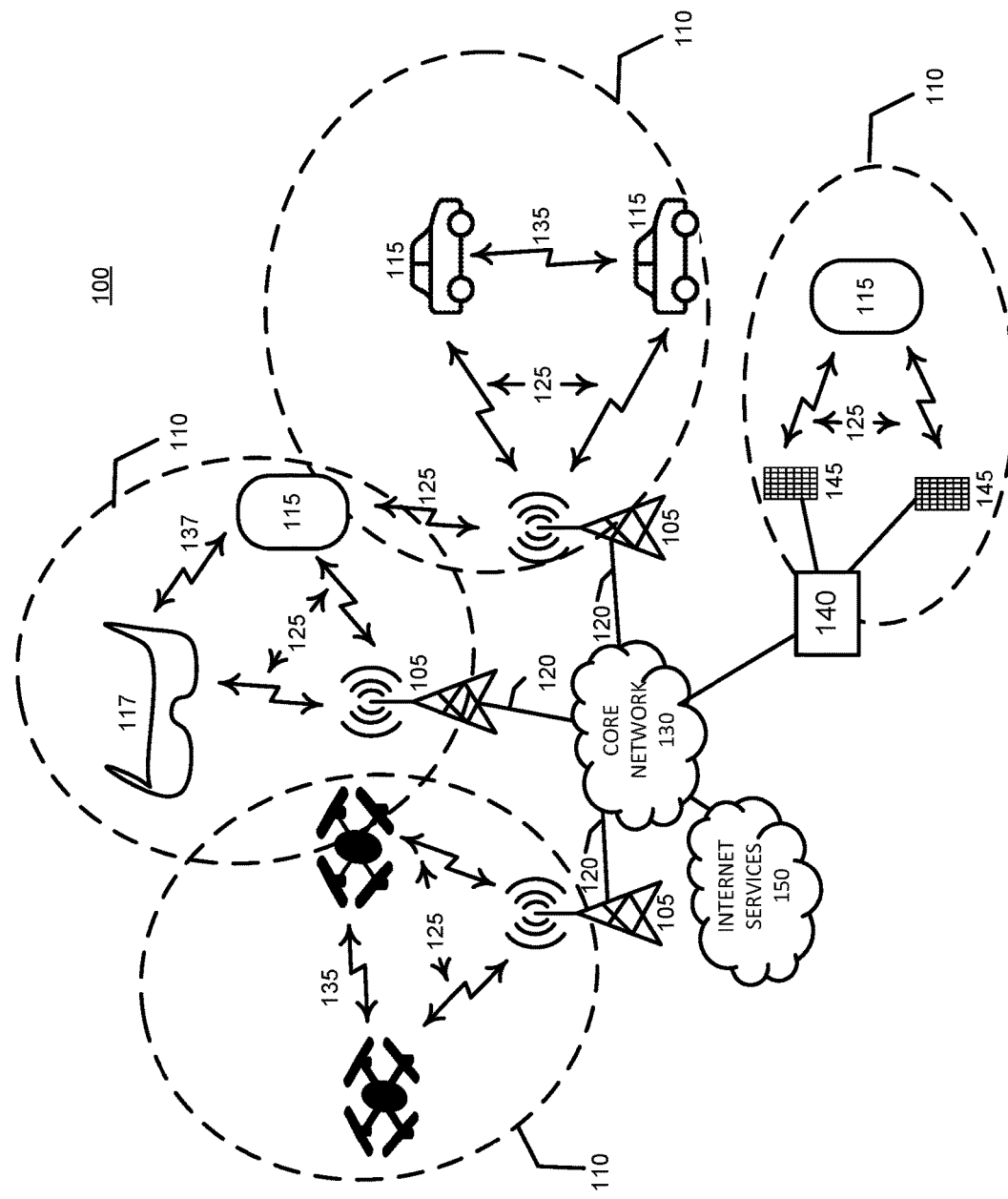
FIG. 1 illustrates wireless communication system environment.

As a preliminary matter, it will be readily understood by those persons skilled in the art that the present embodiments are susceptible of broad utility and application. Many methods, embodiments, and adaptations of the present application other than those herein described as well as many variations, modifications and equivalent arrangements, will be apparent from or reasonably suggested by the substance or scope of the various embodiments of the present application.

Accordingly, while the present application has been described herein in detail in relation to various embodiments, it is to be understood that this disclosure is illustrative of one or more concepts expressed by the various example embodiments and is made merely for the purposes of providing a full and enabling disclosure. The following disclosure is not intended nor is to be construed to limit the present application or otherwise exclude any such other embodiments, adaptations, variations, modifications and equivalent arrangements, the present embodiments described herein being limited only by the claims appended hereto and the equivalents thereof.

As used in this disclosure, in some embodiments, the terms "component," "system" and the like are intended to refer to, or comprise, a computer-related entity or an entity related to an operational apparatus with one or more specific functionalities, wherein the entity can be either hardware, a combination of hardware and software, software, or software in execution. As an example, a component can be, but is not limited to being, a process running on a processor, a processor, an object, an executable, a thread of execution, computer-executable instructions, a program, and/or a computer. By way of illustration and not limitation, both an application running on a server and the server can be a component.

One or more components can reside within a process and/or thread of execution and a component can be localized on one computer and/or distributed between two or more computers. In addition, these components can execute from various computer readable media having various data structures stored thereon. The components can communicate via local and/or remote processes such as in accordance with a signal having one or more data packets (e.g., data from one component interacting with another component in a local system, distributed system, and/or across a network such as the internet with other systems via the signal). As another example, a component can be an apparatus with specific functionality provided by mechanical parts operated by electric or electronic circuitry, which is operated by a software application or firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments.

The term "facilitate" as used herein is in the context of a system, device or component "facilitating" one or more actions or operations, in respect of the nature of complex computing environments in which multiple components and/or multiple devices can be involved in some computing operations. Non-limiting examples of actions that may or may not involve multiple components and/or multiple devices comprise transmitting or receiving data, establishing a connection between devices, determining intermediate results toward obtaining a result, etc. In this regard, a computing device or component can facilitate an operation by playing any part in accomplishing the operation. When operations of a component are described herein, it is thus to be understood that where the operations are described as facilitated by the component, the operations can be optionally completed with the cooperation of one or more other computing devices or components, such as, but not limited to, sensors, antennae, audio and/or visual output devices, other devices, etc.

Further, the various embodiments can be implemented as a method, apparatus or article of manufacture using standard programming and/or engineering techniques to produce software, firmware, hardware or any combination thereof to control a computer to implement the disclosed subject matter. The term "article of manufacture" as used herein is intended to encompass a computer program accessible from any computer-readable (or machine-readable) device or computer-readable (or machine-readable) storage/communications media. For example, computer readable storage media can comprise, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

The PDCCH of a 5G NR system may deliver downlink and uplink control information to cellular devices. Compared to the control channel design of the fourth generation (e.g., LTE), the 5G control channel can match requirements of the URLLC and eMBB use cases and can offer an efficient coexistence between those different QoS classes.

The 5G PDCCH channel, unlike the Fourth Generation control channel, may be beamformed using favored-channel vectors of each UE, with embedded demodulation-assisting demodulation reference signals ("DMRS"). The PDCCH may be modulated by a fixed QPSK modulation scheme and with a conservative coding rate such as the reliability of receiving the PDCCH channel at a UE device is maximized. For example, to satisfy a URLLC 10e-5 reliability level, the PDCCH channel decoding ability may be enhanced at the device end.

The resource size of each PDCCH channel, which may be carrying the downlink control information ("DCI") of one or more UEs, may be time-varying, and may be referred to as PDCCH aggregation level. In particular, and to enhance PDCCH decoding, the network may increase the resource size of the PDCCH channel and accordingly adopt a more conservative and resource-less-efficient coding rate of the PDCCH. This implies that same amount of PDCCH control information is transmitted with a stronger coding rate (i.e., more redundant bits for error detection and correction) at the expense of consuming more channel resources for transmitting the PDCCH information.

There are two types of PDCCH channels. First, the UE-specific PDCCH, where a set channel resources are periodically monitored by a single UE/device. After being configured, the device will attempt to blindly decode those candidate resources in case they may be potentially carrying DCI information. This DCI information includes configurations on scheduled uplink or downlink grants, transmission configurations, and information on common system signaling and updates. Furthermore, the blind decoding is the process when the UE attempts decoding the DCI with all possible transmission configurations and aggregation levels. This implies a heavy power consumption on the device end; however, it is necessary because the UE is not yet aware about the actual configurations of the PDCCH channel and corresponding transmissions. It shall be aware of such after it successfully decodes the PDCCH. In the active mode, the UE may monitor the configured one or more PDCCH search spaces, where a search space implies a set of candidate resources that may carry the PDCCH/DCI information. The search space definitions may be used to refer to varying size of the PDCCH channel (i.e., aggregation levels) and hence, the required size of resources to carry the PDCCH may vary.

Common PDCCH search spaces are monitored by all UEs. Those common PDCCH channels typically carry DCI information that are relevant to all devices. Examples include system updates and control information, all-UE power control information, and general system information.

For each scheduled downlink or uplink transmission, there typically is a preceding PDCCH control transmission informing the UE device about resources scheduled by the network for the transmission, and transmission configurations to use for transmission in the uplink or reception in the downlink. Accordingly, the PDCCH transmissions are considered as signaling overhead, which should be always minimized, and needed for successful device transmission and/or reception.

As an example use case that illustrates example embodiments disclosed herein, Virtual Reality ("VR") applications and VR variants, (e.g., mixed and augmented reality) may at some time perform best when using NR radio resources associated with URLLC while at other times lower performance levels may suffice. A virtual reality smart glass device may consume NR radio resources at a given broadband data rate having more stringent radio latency and reliability criteria to provide a satisfactory end-user experience.

5G systems should support 'anything reality' ("XR") services. XR services may comprise VR applications, which are widely adopted XR applications that provide an immersive environment which can stimulate the senses of an end user such that he, or she, may be 'tricked' into the feeling of being within a different environment than he, or she, is actually in. XR services may comprise Augmented Reality ('AR') applications that may enhance a real-world environment by providing additional virtual world elements via a user's senses that focus on real-world elements in the user's actual surrounding environment. XR services may comprise Mixed reality cases ("MR") applications that help merge, or bring together, virtual and real worlds such that an end-user of XR services interacts with elements of his, or her, real environment and virtual environment simultaneously.

Different XR use cases may be associated with certain radio performance targets. Common to XR cases, and unlike URLLC or eMBB, high-capacity links with stringent radio and reliability levels are typically needed for a satisfactory end user experience. For instance, compared to 5 Mbps URLLC link with a 1 ms radio budget, some XR applications need 100 Mbps links with a couple of milliseconds of the allowed radio latency. Thus, 5G radio design and associated procedures may be adapt to the new XR QoS class and associated targets.

XR service may be facilitated by traffic having certain characteristics associated with the XR service. For example, XR traffic may typically be periodic with time-varying packet size and packet arrival rate. In addition, different packet traffic flows of a single XR session may affect an end user's experience differently. For instance, a smart glass that is streaming 180-degree high-resolution frames may use a large percentage of a broadband service's capacity for fulfilling user experience. However, frames that are to be presented to a user's pose direction (e.g., front direction) are the most vital for an end user's satisfactory user experience while frames to be presented to a user's periphery vision have less of an impact on a user's experience and thus may be associated with a lower QoS requirement for transport of traffic packets as compared to a QoS requirement for transporting the pose-direction traffic flow. Therefore, flow differentiation that prioritizes some flows, or some packets of a XR session over other flows or packets may facilitate efficient use of a communication system's capacity to deliver the traffic. Furthermore, XR capable devices (e.g., smart glasses, projection wearables, etc.) may be more power-limited than conventional mobile handsets due to the limited form factor of the devices. Thus, techniques to maximize power saving operation at XR capable device is desirable. Accordingly, a user equipment device accessing XR services, or traffic flows of an XR session, may be associated with certain QoS metrics to satisfy performance targets of the XR service in terms of perceived data rate or end to end latency and reliability, for example.

Sidelink communications refers to cellular devices communicating with each other directly, without having to go through a serving RAN node, by establishing a sidelink communication link. However, a RAN node may or may not control how sidelink resources are being reserved and dictated by different sidelink devices. In one sidelink radio resource management option, sidelink devices are configured to always request a sidelink resource towards another sidelink device from the serving RAN node. This requires that at least, the transmitting sidelink node to be within the coverage of the serving node. Furthermore, the sidelink-experienced communication latency clearly increases due to the additional transmission of the RAN scheduling request and reception of the corresponding scheduling grant before the sidelink scheduling and transmission are triggered. Advantageously, this reduces the possibility of sidelink channel collisions.

In another radio resource management option, sidelink devices are configured to autonomously sense the sidelink channel resources, determine which sidelink resource are reserved for other devices' sidelink transmissions, and determine which resource set is free/available for their own transmission. The channel sensing rules and high-level channel sensing configurations are indicated from the RAN network. Therefore, the sidelink control channel has been designed to support efficient channel sensing over the sidelink interface. In particular, the sidelink control channel is designed in a two-stage format. The first stage carries a first stage sidelink control information ("SCI") and the second stage carries a second stage SCI.

The first stage SCI is similar to the RAN downlink control information ("DCI") and may carry the following information elements: scheduling information of a reserved data resource for a sidelink transmission of interest, and scheduling resource information of the second stage SCI that carries the transmission-specific configuration of the sidelink data channels.

Accordingly, sidelink devices attempt blindly decoding of the first stage SCI to determine which sidelink data resource will be reserved by which sidelink device in proximity. However, the sensing sidelink device cannot determine whether an actual sidelink data payload is destined for it, thus a sidelink device decodes the second stage SCI. The second stage SCI carries the following information elements: source device and destination device identifiers of the sidelink transmission, and sidelink transmission configurations including modulation schemes, coding schemes, and HARQ feedback information.

Therefore, a sidelink device monitors and blindly decodes the first stage SCI to determine the reserved channel resources for the associated sidelink transmission, determines transmission configurations of the second stage SCI, and decodes the second stage SCI to determine if a corresponding sidelink transmission is destined for it. If a sidelink device is a transmit-only device (e.g., an M2M device), the device need only receive and blindly decode the first stage SCI, while skipping decoding of the second stage SCI, in which case channel sensing may only comprise monitoring, detection, and blind decoding of the first stage SCI.

There are two modes of channel sensing. First, continuous channel sensing may be configured such that a control channel of the sidelink interface signaling can flexibly be placed at any time instant such that a sensing sidelink device needs to always search and monitor for a control channel that is carrying the first stage SCI. Second, and due to the significant power consumption burden of the continuous sensing, a partial channel sensing procedure may be implemented, such that the sidelink control channel is configured to be periodically, or non-periodically, transmitted during predefined time instants, and accordingly, sensing sidelink device need only monitor and blindly decode those timing and frequency instants while possibly deep sleeping otherwise.

Sidelink relays are sidelink devices that are performing sidelink and RAN functions on behalf of, or for the sake of, other remote sidelink devices in proximity to the sidelink relay. Sidelink relays offers a wide set of sidelink functions for remote sidelink devices including channel granting, multi-hop traffic relaying, or paging monitoring. Thus, less capable sidelink remote devices obtain several performance advantages such as power saving gains, and sidelink and RAN network coverage extension. Accordingly, there are two modes which a sidelink relay device may adopt for announcing their presence for remote devices in proximity. In one variant, sidelink relays explicitly announce their presence using a preconfigured discovery procedure. During the configured discovery period, sidelink relay broadcasts an announcement message that indicates their presence and their associated relaying configurations. Remote devices receive a relay's discovery messages and, upon interest in becoming part of, or a member of, a sidelink zone, or group, that includes the relay, initiate a direct communication link with the sidelink relay.

In another discovery variant, a sidelink remote device proactively transmits a discovery message requesting that sidelink relays in proximity announce their presence and corresponding relaying services. This option offers the advantage of the on-demand discovery signaling where sidelink relays avoid transmitting unnecessary discovery messages that may not be utilized by present remote devices in proximity.

Layer-2 relaying denotes that the end-to-end protocol stack and QoS targets over sidelink interface will not be interrupted at the relay, e.g., the relay alters lower layer headers to perform traffic relaying. Thus, with layer-2 relays, the end-to-end QoS and flows can be tracked and maintained. However, for layer-3 relaying, the end-to-end QoS is lost at the relay side because the latter alters and translates the original QoS flows metrics to corresponding relay-specific metrics.

Sidelink discontinuous reception ("DRX") cycle and channel partial sensing partially address the issue of device battery consumption. A sidelink device is configured with a DRX cycle that consists of a period of monitoring control channels to determine if there is a scheduled sidelink reception, and a period of deep sleeping such that power consumption of the sidelink device is optimized. Unlike RAN DRX procedures, sidelink inter-device coordination procedures must be in place for sidelink DRX, due to the distributed nature of the sidelink interface. For example, a sidelink device my transmit a sidelink scheduling information towards another sidelink device in proximity that is currently deep sleeping, leading to the sleeping device missing the detection of the scheduling information, and accordingly, increasing the sidelink transmission latency. Thus, sidelink devices in proximity coordinate on DRX cycles that are common at least between device pairs of interest.

Regarding partial channel sensing, sidelink devices implementing continuous channel sensing need to always monitor sidelink control channels for potential scheduled transmissions, which results in significant battery power consumption due to the frequent blind decoding attempts. With partial channel sensing and sidelink DRX, the scheduling of the control channel is preconfigured during certain periodic occasion that sidelink devices expect to perform channel sensing. Thus, partial channel sensing enables sidelink devices to deep sleep over extended periods of time, even during a sidelink DRX channel wake period.

However, due to the functionality that the sidelink relays perform, power consumption is exacerbated for sidelink relays compared to non-relay sidelink UEs. That is, a sidelink relay needs to perform RAN-like procedures as well as sidelink functions for the relay device itself and its connected remote sidelink devices, leading to significant battery consumption. A sidelink relay relays traffic and performs RAN/sidelink functions on behalf of the connected remote sidelink devices. A sidelink relay may monitor and decode RAN/sidelink paging on behalf of remote devices. The higher the number of remote devices that are connected to the relay as part of a sidelink group, or zone, the more the number of paging occasions the sidelink relay monitors, detects, and decodes, which consumes battery power of the sidelink relay at a high rate. In addition, a sidelink relay may perform sidelink routing and relaying of traffic towards not-in-RAN-coverage sidelink devices. A sidelink relay device may also perform continuous and/or partial channel sensing on behalf of connected in-coverage remote sidelink devices. Such upgraded, or additional, functionality of sidelink relay devices introduces a power consumption limitation at the device end. Thus, power saving optimization procedures are desirable to enhance battery charge/energy availability at battery powered sidelink relays.

User equipment devices of a multi-device aggregation group may dynamically coordinate among each other to perform a certain function at a certain device or to relax a certain radio function from a certain coordinating device. For example, one of the group of user equipment devices can function as a relay device that communicates with a RAN serving the members of the group. The relay UE may be referred to as a relay UE or as a primary UE. The other members of the group may be referred to as remote, secondary, or tethered UE devices. Device aggregation and corresponding device-to-device signaling exchange can be executed over a sidelink interface, which may follow, for example, a 3$^{rd}$ Generation Partnership Project ("3GPP") specification, or via device implementation-specific communication links.

Device aggregation facilitates members of a group of user equipment devices to collaborate/coordinate performing of one or more functions for one or more of the coordinating devices. Device-to-device communications and respective signaling can be performed over standardized sidelink interface or over device-specific communication links. Embodiments disclosed herein facilitate network support of aggregation schemes to perform efficient radio function aggregation in which primary/relay devices (e.g., aggregated or delegated devices) perform radio functions or receive or transmit radio traffic on behalf of secondary devices (e.g., delegating devices). Instead of a primary aggregated device performing a separate random access process on behalf of each of multiple connected secondary devices, (e.g., transmitting multiple preambles, multiple radio resource control (RRC) connection requests, and receiving multiple independent RRC connection setup responses), a primary device may perform procedures for aggregated initial random access and uplink traffic scheduling, and may handle aggregated traffic, thus, avoiding repetition of certain connection establishment actions for each of one or more connected secondary devices of an aggregation group of user equipment devices. Embodiment disclosed herein may comprise novel uplink indications that facilitate network RAN awareness of device aggregation uplink setup, or arrangement, and novel signaling formats for the aggregate handling of the multi device control and data uplink information or traffic.

With device aggregation embodiments disclosed herein, a group of user equipment devices may coordinate regarding a certain radio function for one or more user equipment devices to optimize capacity and power saving gains. Awareness by a network RAN may facilitate aggregation procedures of granting uplink resources or for transmitting aggregated uplink traffic.

Turning now to the figures, FIG. 1 illustrates an example of a wireless communication system 100 that supports blind decoding of PDCCH candidates or search spaces in accordance with aspects of the present disclosure. The wireless communication system 100 may include one or more base stations 105, one or more UEs 115, and core network. 130. In some examples, the wireless communication system 100 may be a Long-Term Evolution (LTE) network, an LTE-Advanced (LTE-A) network, an LTE-A Pro network, or a New Radio (NR) network. In some examples, the wireless communication system 100 may support enhanced broadband communications, ultra-reliable (e.g., mission critical) communications, low latency communications, communications with low-cost and low-complexity devices, or any combination thereof. As shown in the figure, examples of UEs 115 may include smart phones, automobiles or other vehicles, or drones or other aircraft. Another example of a UE may be a virtual reality appliance 117, such as smart glasses, a virtual reality headset, an augmented reality headset, and other similar devices that may provide images, video, audio, touch sensation, taste, or smell sensation to a wearer. A UE, such as VR appliance 117, may transmit or receive wireless signals with a RAN base station 105 via a long-range wireless link 125, or the UE/VR appliance may receive or transmit wireless signals via a short-range wireless link 137, which may comprise a wireless link with a UE device 115, such as a Bluetooth link, a Wi-Fi link, and the like. A UE, such as appliance 117, may simultaneously communicate via multiple wireless links, such as over a link 125 with a base station 105 and over a short-range wireless link. VR appliance 117 may also communicate with a wireless UE via a cable, or other wired connection. A RAN, or a component thereof, may be implemented by one or more computer components that may be described in reference to FIG. 12.

Continuing with discussion of FIG. 1, base stations 105 may be dispersed throughout a geographic area to form the wireless communication system 100 and may be devices in different forms or having different capabilities. The base stations 105 and the UEs 115 may wirelessly communicate via one or more communication links 125. Each base station 105 may provide a coverage area 110 over which UEs 115 and the base station 105 may establish one or more communication links 125. Coverage area 110 may be an example of a geographic area over which a base station 105 and a UE 115 may support the communication of signals according to one or more radio access technologies.

UEs 115 may be dispersed throughout a coverage area 110 of the wireless communication system 100, and each UE 115 may be stationary, or mobile, or both at different times. UEs 115 may be devices in different forms or having different capabilities. Some example UEs 115 are illustrated in FIG. 1. UEs 115 described herein may be able to communicate with various types of devices, such as other UEs 115, base stations 105, or network equipment (e.g., core network nodes, relay devices, integrated access and backhaul (IAB) nodes, or other network equipment), as shown in FIG. 1.

Base stations 105 may communicate with the core network 130, or with one another, or both. For example, base stations 105 may interface with core network 130 through one or more backhaul links 120 (e.g., via an S1, N2, N3, or other interface). Base stations 105 may communicate with one another over the backhaul links 120 (e.g., via an X2, Xn, or other interface) either directly (e.g., directly between base stations 105), or indirectly (e.g., via core network 130), or both. In some examples, backhaul links 120 may comprise one or more wireless links.

One or more of base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a bNodeB or gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, a personal computer, or a router. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, vehicles, or smart meters, among other examples.

UEs 115 may be able to communicate with various types of devices, such as other UEs 115 that may sometimes act as relays as well as base stations 105 and the network equipment including macro eNBs or gNBs, small cell eNBs or gNBs, or relay base stations, among other examples, as shown in FIG. 1.

UEs 115 and base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A. LTE-A Pro, NR). Each physical layer channel may carry acquisition signaling (e.g., synchronization signals, system information), control signaling that coordinates operation for the carrier, user data, or other signaling. Wireless communication system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by UEs 115. A carrier may be operated in a standalone mode where initial acquisition and connection may be conducted by UEs 115 via the carrier, or the carrier may be operated in a non-standalone mode where a connection is anchored using a different carrier (e.g., of the same or a different radio access technology).

Communication links 125 shown in wireless communication system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications e.g., in a TDD mode).

A carrier may be associated with a particular bandwidth of the radio frequency spectrum, and in some examples the carrier bandwidth may be referred to as a "system bandwidth" of the carrier or the wireless communication system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communication system 100 (e.g., the base stations 105, the UEs 115, or both) may have hardware configurations that support communications over a particular carrier bandwidth or may be configurable to support communications over one of a set of carrier bandwidths. In some examples, the wireless communication system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE. A wireless communications resource may refer to a combination of a radio frequency spectrum resource, a time resource (e.g., a search space), or a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for a UE 115 may be restricted to one or more active BWPs.

The time intervals for base stations 105 or UEs 115 may be expressed in multiples of a basic time unit which may, for example, refer to a sampling period of $T_s = 1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods e.g., depending on the length of the cyclic prefix prepended to each symbol period). In some wireless communication systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communication system 100 and may be referred to as a transmission time interval (TTI). In some examples, the TTI duration (e.g., the number of symbol periods in a TTI) may be variable. Additionally, or alternatively, the smallest scheduling unit of the wireless communication system 100 may be dynamically selected (e.g., in bursts of shortened TTIs (STTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of UEs 115. For example, one or more of UEs 115 may monitor or search control regions, or spaces, for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115. Other search spaces and configurations for monitoring and decoding them are disclosed herein that are novel and not conventional.

A base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others).

In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of a base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., UEs 115 in a closed subscriber group (CSG), UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communication system 100 may include, for example, a heterogeneous network in which different types of the base stations 105 provide coverage for various geographic coverage areas 110 using the same or different radio access technologies.

The wireless communication system 100 may support synchronous or asynchronous operation. For synchronous operation, the base stations 105 may have similar frame timings, and transmissions from different base stations 105 may be approximately aligned in time. For asynchronous operation, base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communication system 100 may be configured to support ultra-reliable communications or low-latency communications, or various combinations thereof. For example, the wireless communication system 100 may be configured to support ultra-reliable low-latency communications (URLLC) or mission critical communications. UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). Communication link 135 may comprise a sidelink communication link. One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of UEs 115 communicating via D2D communications may utilize a one-to-many (1:M) system in which a UE transmits to every other UE in the group. In some examples, a base station 105 facilitates the scheduling of resources for D2D communications. In other cases, D2D communications are carried out between UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more RAN network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. Core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for UEs 115 that are served by the base stations 105 associated with core network 130. User IP packets may be transferred through the user plane entity, which may provide IP address allocation as well as other functions. The user plane entity may be connected to IP services 150 for one or more network operators. IP services 150 may comprise access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices e.g., radio heads and ANCs) or consolidated into a single network device (e.g., a base station 105).

The wireless communication system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communication system 100 may also operate in a super high frequency (SHE) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communication system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communication system 100 may utilize both licensed and unlicensed radio frequency spectrum bands. For example, the wireless communication system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as base stations 105 and UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally, or alternatively, an antenna panel may support radio frequency beamforming for a signal transmitted via an antenna port.

Base stations 105 or UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple, user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, a base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by a base station 105 in different directions and may report to the base station an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). A UE 115 may report feedback that indicates precoding weights for one or more beam directions, and the feedback may correspond to a configured number of beams across a system bandwidth or one or more sub-bands. A base station 105 may transmit a reference signal (e.g., a cell-specific reference signal (CRS), a channel state information reference signal (CSI-RS)), which may be precoded or unprecoded. A UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communication system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

Aggregation of uplink random access—Compact/multi-device random access and connection establishment.

Uplink random access and connection establishment is typically a first procedure a user equipment device performs to receive traffic or to transmit traffic. For device aggregation, a primary device of an aggregation group of user equipment devices conventionally repeats random access and connection establishment procedures for each of multiple user equipment secondary devices that are connected with, or part of, the aggregation group, which procedures may comprise transmitting multiple preambles for the respective secondary devices, transmitting multiple scheduling requests, performing multiple RRC signaling message exchanges, etc.

Using embodiments disclosed herein, a primary device may facilitate a multi-device random access procedure to establish a connection to a radio access network ("RAN") node for member secondary user equipment devices of a group of secondary devices at the same time. The single connection establishment may also establish connection for the primary device.

Conventionally, with device aggregation, a primary device can perform those signaling instants on behalf of secondary devices in an aggregation group, by independently executing random access and associated signaling for each of the secondary devices, which is battery-consumption inefficient and processing inefficient. Embodiments disclosed herein facilitate aggregating uplink control channel information for transmitting random access and connection establishment control signaling messages. A primary device may aggregate random-access connection procedures for multiple secondary devices at the same time, with network support and new RRC signaling formats disclosed herein. For example, a primary device may transmit a multi-device RRC connection establishment request signaling message. An aggregated RRC message, as disclosed herein, transmitted by a primary device, may be carried via an uplink resource occasion that is associated with the best serving beam of the primary device. The compact RRC message disclosed herein may include both primary and secondary network access information, that may comprise best serving downlink beam indices, target service identifiers, or device identifiers (e.g., IMSI) of each user equipment device. The network RAN may respond to the aggregated RRC request message only to the primary device, with a compact RRC response message, disclosed herein, that may comprise uplink resource grants, connected-RNTIs identifiers, or device-specific power control spectral efficiency level of each of the primary and secondary devices of an aggregation group as if uplink traffic would be transmitted from the secondary devices themselves. A primary device may generate independent RRC configuration messages, based on the received compact RRC response message from network RAN, each to be transmitted to a single secondary device. Thus, the random access and network connection establishment procedures are offloaded from secondary to primary devices (offering power saving gains at the secondary devices) while primary devices avoid repeating RRC signaling and preamble transmissions for each of the secondary devices, offering a battery charge consumption reduction and processing performance enhancement at the primary device.

Figure 2A:
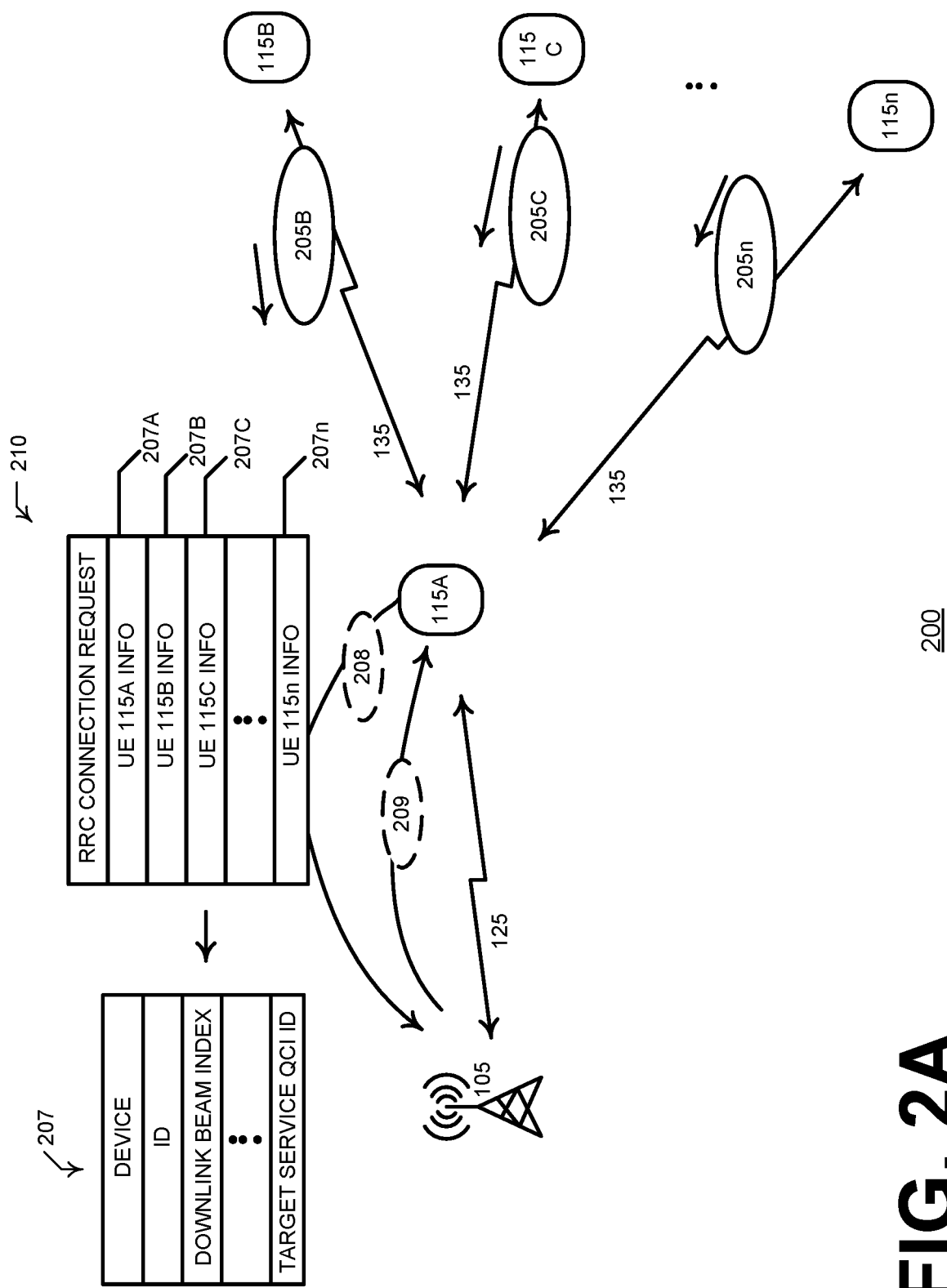
FIG. 2A illustrates an example environment with a relay user equipment to request aggregation uplink resources with an uplink aggregation request message.

Turning now to FIG. 2A, the figure illustrates an example environment 200 comprising a relay, or primary, user equipment device 115A and secondary, remote, or tethered user equipment devices 115B, 115C, . . . 115n. As depicted in FIG. 2A, primary UE device, or relay UE device, 115A, receives initial access information 205B, 205C, . . . 205n from one or more remote/secondary devices 115B, 115C, and 115n. Access information 205 from a secondary UE 115B-115n may comprise an access information indication 207 corresponding to a respective UE's best serving downlink beam, the UE's identifier, such as an International Mobile Subscriber Identifier ("IMSI"), a target network service indicator, and the like, to be used for connection establishment. Primary device 115A, which may be in an idle, or in an inactive state, may transmit to RAN 105 a random-access preamble 208 over an uplink resource occasion that is tied with, or associated with, the primary user equipment's best downlink beam, for example. Preamble 208 is shown in broken lines to indicate that UE 115A may transmit the preamble when in an idle or inactive state before transmitting a compact, aggregated, connection request 210, which may be referred to as an uplink radio resource connection aggregation request message or as an uplink radio resource connection aggregation request message. Preamble 208 may be a group preamble selected from a pool of configured preambles that indicate to RAN 105 that UE 115A may be transmitting an aggregated request message 210, such that, in response to receiving preamble 208, RAN 105 schedules one or more uplink resources for the primary UE to use in transmitting the aggregated request message 210. Preamble 208 may comprise a group preamble code, such as a PRACH preamble, that corresponds to one or more of user equipment devices that make up an aggregation group, such as, for example, primary user equipment 115A and one or more secondary user equipment devices 115B-115n. The group preamble code may be a code selected from a preamble code pool that RAN 105 has associated with establishing of RRC connection with the group of devices, (e.g., to aggregate RRC connection establishment). Preamble 208 may indicate to RAN 105 that idle or inactive primary UE 115A that transmitted preamble 208 is requesting aggregation of RRC resources for the aggregation group; in response to receiving preamble 208 the RAN may automatically send an aggregated grant message, such as uplink aggregation grant message 212 described in reference to FIG. 2B.

Continuing with description of FIG. 2A, preamble 208 can be configured (e.g., by RAN 105) as one of a pool of preambles that are assigned for RRC aggregation. For example, RAN 105 may configure UE 115A (e.g., via broadcast) to select and transmit a preamble from the pool of preambles if an aggregated request message 210 is to be transmitted. Thus, receiving a preamble from the group of preambles assigned to indicate an aggregation request 210, RAN 105 may automatically schedule resources for a next RRC request message from primary device 115A, which request message may comprise access information associated with UE devices of an aggregation group, to accommodate message 210, which may be larger (e.g., in terms of bits or bytes), than a conventional single-device RRC request message. Group preamble 208 may also facilitate indicating to RAN 105 which type of forthcoming RRC connection request message (e.g., single-UE or aggregated) to decode and thus avoid, or minimize, blind decoding of a request message.

If primary UE 115A is not in an idle or inactive state when a determination is made to transmit an aggregated, or aggregation, request message 210, primary UE 115A may indicate to RAN 105, via an uplink control channel resource already scheduled for the primary UE, that an aggregated connection establishment request message 210 may be forthcoming. In response, RAN 105 may transmit to primary UE 115A an upgraded uplink control channel resource grant indication 209 that may indicate a larger (e.g., longer duration or different frequencies) uplink control channel resource than an uplink resource already scheduled for the primary UE to use for uplink control channel messages. Indication 209 is shown in broken lines to indicate that resource indication 209 may not be transmitted from RAN 105 to primary UE 115A if a preamble 208 is used to indicate an aggregated request.

In an embodiment, if primary device 115A is in a connected RRC state when it receives RRC access information from one or more idle or inactive secondary UE devices 115B-115n, the primary device may transmit uplink radio resource connection aggregation request message 210 via an uplink control channel as an uplink control channel information ("UCI") message. In an embodiment, if a size, or data amount, of an uplink radio resource connection aggregation request message 210 is larger than a configured threshold for transmitting a UCI, primary device 115A may transmit a UCI indication for obtaining scheduling of a resource to transmit the uplink radio resource connection aggregation request message over an uplink data channel between UE 115A and RAN 105.

Request message 210 may contain indications of access information 207B-207m, corresponding to one or more secondary user equipment devices 115B-115n. Message 210 may comprise access information 207A corresponding to primary user equipment 115A. Thus, primary device 115A may transmit an uplink radio resource connection aggregation request message 210, which may comprise RRC signaling messages, to establish RRC connection for members of an aggregation group that may comprise user equipment devices 115A-115n. Contents 207 corresponding to one of UEs 115A-115n in the group-common RRC connection establishment request message 210, transmitted from the primary device towards RAN 105, may comprise: Random access information of a combination of the primary UE device UE 115A and secondary UE devices 115B-115n, such as, for example, a device identifier, a best serving downlink beam determined by respective devices 115A-n, or one or more target service identifiers of services to be requested from RAN 105.

Figure 2B:
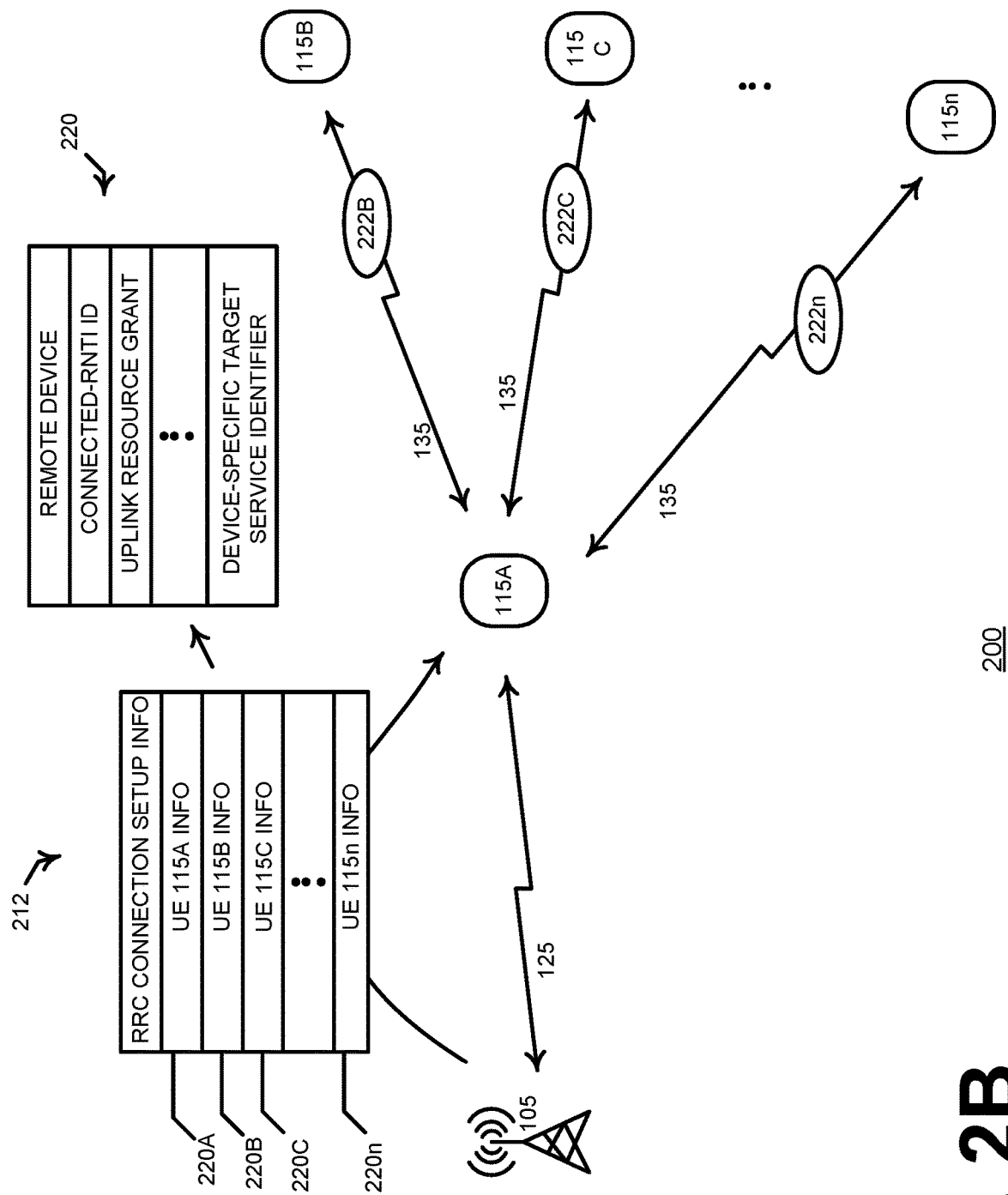
FIG. 2B illustrates an example environment with a relay user equipment to relay an uplink resource grant contained an uplink aggregation grant message to a remote user equipment.

Responsive to transmitting uplink radio resource connection aggregation request message 210 and exchanging corresponding signaling messages back and forth with RAN 105, primary user equipment 115A may receive a single, group-common RRC response 212 from RAN 105 as depicted in FIG. 2B. A group-common RRC response 212 received by UE 115A from RAN 105 may be referred to as an uplink aggregation grant message 212 and may comprise uplink grant information 220A-220n corresponding to primary UE 115A and one or more secondary user equipment devices 115B-115n, respectively, which may be part of an aggregation group with primary UE 115A. For example, uplink grant information 220 may comprise information elements, such as, for example: A connected RNTI identifier of each of primary UE device 115A and secondary UE devices 115B-15n, announced in the former RRC connection establishment request message 210 transmitted from primary device 115A. If RAN 105 does not accept admission of one or more secondary UE devices 115B-115n. C-RNTI identifiers corresponding to the not-accepted secondary UE devices may be assigned as NULL in message 212. Uplink grant information associated with each device may comprise timing or frequency resource information. Device-specific uplink power control settings may be indicated in message 212 in terms of an indication corresponding to a target spectral efficiency of a UE device 115B-115n. Upon receiving, by primary UE 115A, an aggregated, RRC multi-device connection establishment response 212 from the network RAN 105, the primary UE may compile individual RRC configuration messages 222B-222n. Each message 222B-222n may be directed to, by primary UE 115A, a single secondary device 115B-115n, respectively, and may contain RRC configuration information and uplink grant information associated with the respective secondary device in the aggregated RRC response message 212.

Figure 3:
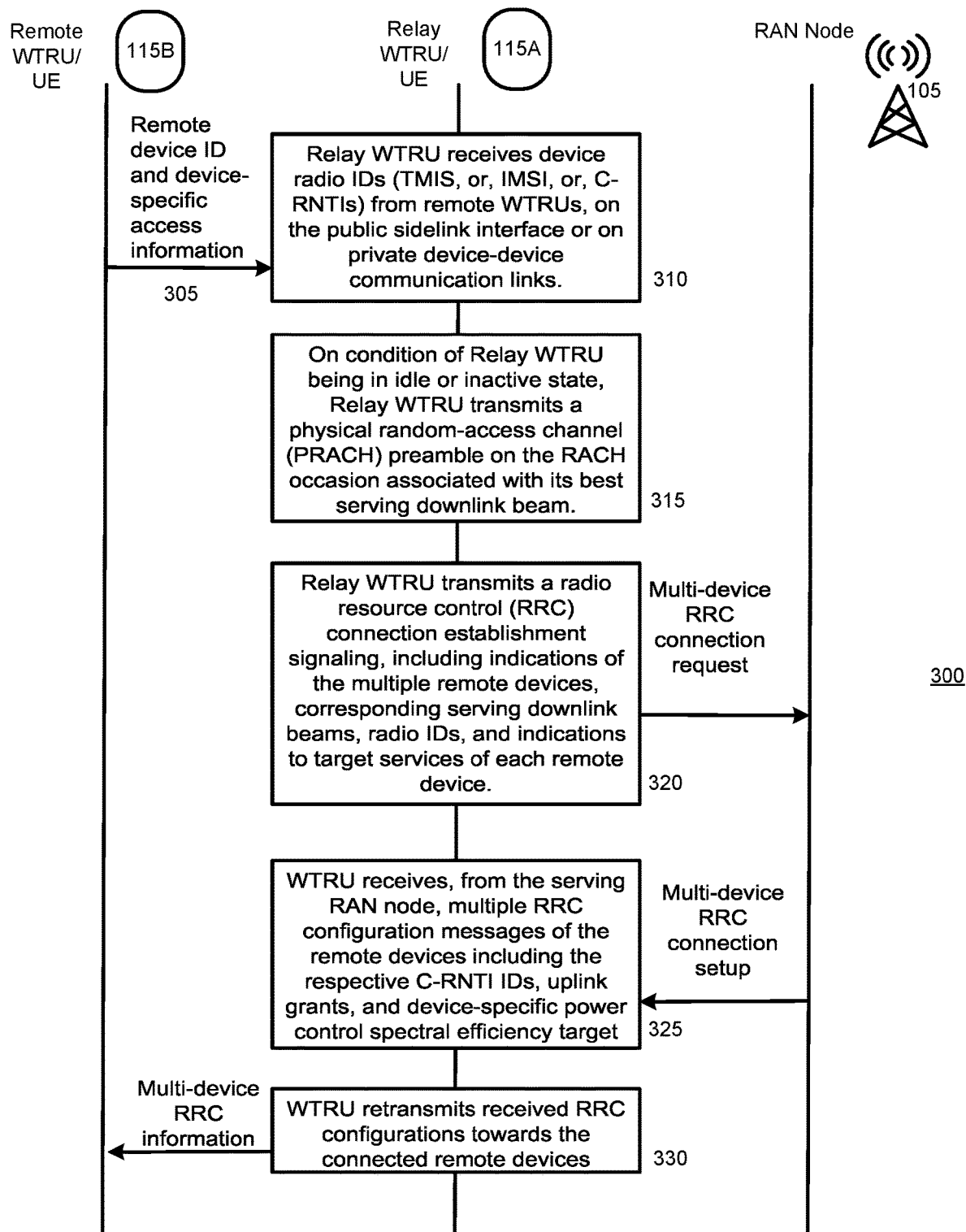
FIG. 3 illustrates a timing diagram of an example method to request and relay an uplink resource.

Turning now to FIG. 3 the figure illustrates a timing diagram of an example method 300 comprising relay UE 115A relaying uplink information on behalf of UE115B. At act 305, secondary/remote UE 115B transmits, and at act 310 relay UE/WTRU 115A receives from the secondary UE, access information corresponding thereto. The access information may comprise radio identifiers, for example a Temporary Mobile Subscriber Identity, and International Mobile Subscriber Identity, or a Connected Mode Radio Network Temporary Identifier (e.g., TMIS, IMSI, or C-RNTI, respectively) and may be received from secondary UE 115B via a public sidelink interface or via private device-device communication links.

At act 315, in an embodiment, on condition of primary/relay WTRU/UE 115A being in an idle or inactive state, the primary UE may transmit a physical random-access channel ("PRACH") preamble on a random access channel ("RACH") occasion associated with the primary UE's best serving downlink beam determined by the primary UE. The preamble transmitted at act 315 may comprise a group-preamble, which may have been assigned by RAN 105 to correspond to an aggregation group that comprises primary UE 115A, secondary 115B, and any other secondary UE that may be part of the aggregation group. Thus, upon RAN 105 receiving a group-preamble transmitted at act 315, the RAN recognizes that primary UE 115A is requesting, in an aggregated manner, scheduling of uplink resources for the user equipment devices of the aggregations group. (It will be appreciated that UE 115A is part of the aggregation group, may have uplink traffic to be transmitted, and RAN 105 may schedule an uplink resource for the primary UE response to receiving the preamble transmitted at act 315.) Primary UE 115A, at act 315, may transmit a PREACH preamble that is specific to the primary UE. In response to the preamble, primary/relay WTRU/UE 115A may receive, from RAN 105, an uplink grant for transmitting an aggregate multi-device RRC connection establishment message, such as an uplink aggregation request message.

In another embodiment, if primary UE 115A is not in an idle or inactive state, or if the primary UE is in an RRC connected state, when uplink traffic to be transmitted is indicated as being present at secondary UE 115B, at act 315, UE 115a may transmit, via an uplink control channel ("UCI") an indication that an uplink aggregation request message, such as message 210 described in reference to FIG. 2A, may be forthcoming. In response, RAN 105 may transmit to UE 115A an indication of a larger, or more robust, uplink control channel resource to use in transmitting an uplink aggregation request message as an uplink control indication message ("UCI") using radio resource control connection establishment signaling, which uplink aggregation request message may comprise: indications of the multiple remote devices, corresponding serving downlink beams, radio identifiers, or indications to target services of each remote device.

After uplink control channel resources have been granted in response to UE 115A transmitting at act 315 a preamble or UCI message requesting resources to transmit an uplink aggregation request, at act 320, UE 115A may transmit, via an uplink control channel and as a UCI, an uplink aggregation request message that may comprise: indications of multiple remote devices, corresponding serving downlink beams, radio identifiers, or indications to target services of each remote device. An uplink aggregation request message may be transmitted by UE 115A at act 320 using radio resource control connection establishment signaling. In an embodiment, if a size of an uplink aggregation request message is larger than a configured UCI messaging threshold, primary UE 115A may transmit at act 320 a UCI indication that indicates a request to dynamically schedule resources for transmitting of group-common RRC messages (e.g., RRC messages corresponding to an aggregation group) over an uplink data channel.

At act 325, RAN 105 transmits, and primary UE 115A receives, an uplink aggregation grant message comprising uplink grant information corresponding to the second user equipment. The uplink grant information may comprise multiple RRC configuration messages corresponding to remote UE 115B (and other UE devices of an aggregation group of which UE 115B and UE 115A are members), for example the uplink grant information may comprise C-RNTI IDs, uplink resource grant indications, or device-specific power control spectral efficiency target corresponding to respective secondary UE devices of an aggregation group.

At act 330, primary UE 115A transmits, individually, to secondary UE 115B, or other secondary/remote UE devices of an aggregation group, RRC configuration(s) received at act 325 to which the RRC configurations correspond in the uplink aggregation grant message received at act 325.

Figure 4:
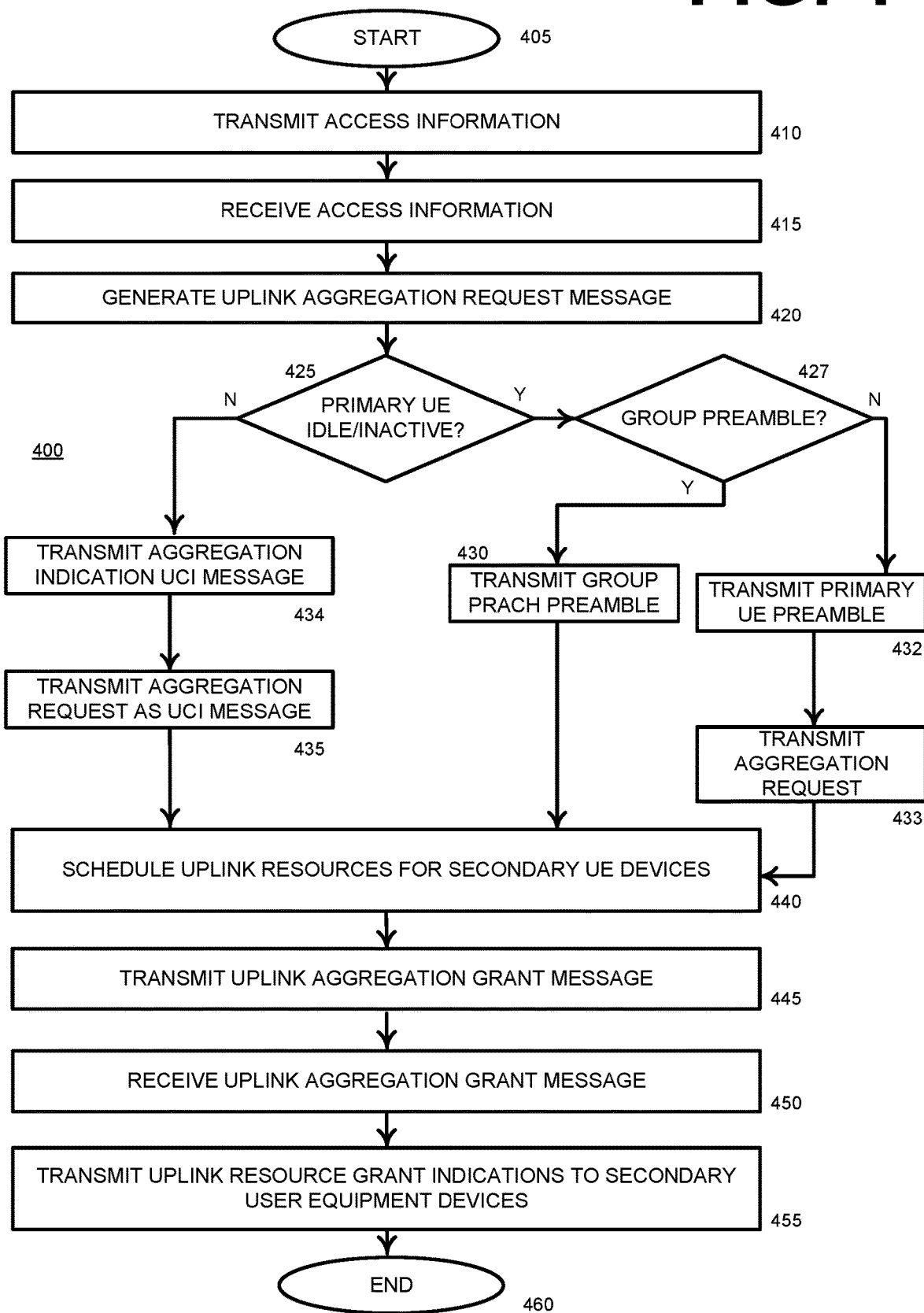
FIG. 4 illustrates a flow diagram of an example method to aggregate uplink resource grants.

FIG. 4 illustrates a flow diagram of an example method embodiment 400 to aggregate uplink resource grants. Method 400 begins at act 405. At act 410, secondary user equipment devices transmit access information to a primary user equipment device, wherein the primary user equipment and the secondary user equipment are part of an aggregation group. At act 415, the primary user equipment receives the access information that was transmitted at act 410. Add act 420 the primary user equipment generates an uplink aggregation request message. At act 425, a determination is made at the primary user equipment whether the primary user equipment is in an idle or inactive state relative to a serving RAN. If a determination made at act 425 is that the primary user equipment is in an idle or inactive state, method 400 advances to act 427. At act 427, a determination is made whether primary user equipment will use a group preamble or a preamble that is specific to the primary user equipment. If the determination is made that a group preamble will be transmitted to a serving ran at act 427, method 400 advances to act 430 and transmits the group preamble to the serving RAN. Returning to description of act 427, if a determination is made that a group preamble is not to be transmitted by the primary user equipment, method 400 advances to act 432. At act 432, the primary user equipment transmits the primary specific preamble to the serving RAN. After transmitting the preamble at act 432, the serving RAN may transmit an indication to the primary user equipment indicating an uplink control channel resource to use for transmitting the uplink aggregation request message that was generated at act 420. The primary user equipment receives the uplink resource from the serving ran and transmits the uplink aggregation request message to the serving RAN at act 433. The transmission of the uplink aggregation request message at act 433 may be via a UCI message.

Returning to description of act 425, if a determination is made that the primary user equipment is in a connected state with the serving RAN, in other words the primary user equipment is not idle or inactive, method 400 advances to act 434. At act 434, the primary user equipment transmits an indication, via a UCI message, indicating to the serving RAN that the primary user equipment may be about to transmit the uplink aggregate aggregation request message that was generated at act 420. In response to transmitting the indication that the primary user equipment will be likely transmitting an uplink aggregation request message, the serving RAN may transmit back to the primary user equipment an uplink control resource that is larger than a previously scheduled uplink control channel resource that the primary user equipment used at act 434 to transmit the indication that it was about to transmit an uplink aggregation request message. At act 435 the primary user equipment transmits the aggregation request message that was generated at act 420 via a UCI message.

At act 440, regardless of whether reached via act 435, act 430, or act 433, the serving RAN schedules one or more uplink resources to be used by the secondary user equipment devices to transmit RRC connection requests. The scheduled uplink resources corresponding to one or more user equipment devices of the aggregation group are combined into an uplink aggregation grant message, which is transmitted from the serving RAN to the primary user equipment at act 445. At act 450, the primary user equipment receives the uplink aggregation grant message. The primary user equipment distinguishes, breaks apart, extracts, or otherwise retrieves the uplink resources, scheduled at act 440 and indicated in the grant message transmitted at act 445, corresponding to the secondary user equipment devices of the aggregation group. The primary user equipment transmits the resources, scheduled at act 440, individually, to the respective secondary user equipment devices that correspond to the scheduled resources. The secondary user equipment devices may then receive and use their respective scheduled uplink resources to establish radio resource control connection with the serving RAN. Method 400 ends at act 460.

Aggregate uplink traffic scheduling and transmission—Compact uplink traffic aggregation.

Currently, for a secondary device of an aggregation group with uplink traffic available for transmission, a primary device transmits a scheduling request, receives a temporary grant, transmits to a RAN a buffer status report on behalf of the secondary device that indicates buffered uplink traffic at the secondary device available for transmission to the RAN, receives an uplink resource grant for the secondary device to use for transmitting the uplink traffic, and transmits an indication of the uplink resource grant to the secondary device. The primary device performs this process for each of multiple secondary user equipment devices in an aggregation group, thus using processing and energy overhead that may be proportional to a number of user equipment devices that make up the aggregation group.

Existing device aggregation procedures may be used to transport data traffic of secondary UE devices that have uplink traffic available for transmission, but that are experiencing poor network reachability or poor radio conditions due to network conditions, for example. Thus, secondary devices may send their respective uplink traffic to a primary device of an aggregation group of which the secondary devices are members. Accordingly, primary devices typically initiate uplink resource scheduling request procedures for each of the connected secondary devices that uplink traffic to be transmitted to a network RAN. For each secondary device, the primary device typically transmits a scheduling request, and accordingly receives an initial scheduling grant. The primary device may then transmit a buffer status report ("BSR") corresponding to a secondary device having traffic to be transmitted, and accordingly receives a final uplink resource grant of one or more resources to be used to transmit the secondary device's upstream traffic by the primary device. The repetition of the same radio operation, (e.g., uplink scheduling request) individually for each secondary devices results in a primary UE using energy and processing power proportionally to a number of user equipment devices with traffic to be transmitted.

Figure 5A:
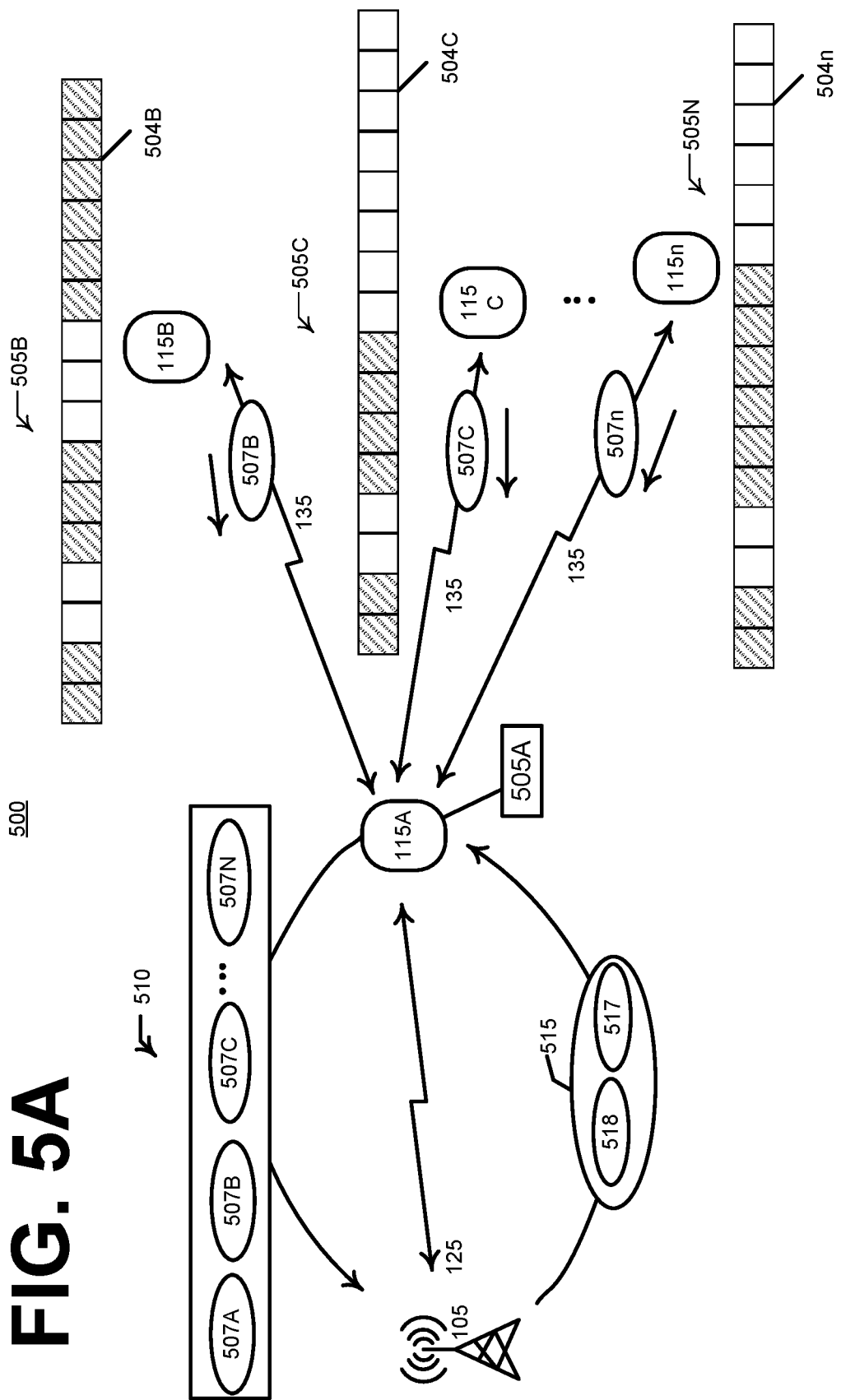
FIG. 5A illustrates an environment with a relay user equipment to relay indicate uplink data traffic to be transmitted from a remote user equipment.

Turning now to FIG. 5A, environment 500 may comprise relay UE 115A and remote, tethered (e.g., tethered via a short-range wireless link such as a sidelink link, a Bluetooth link, a Wi-Fi link, and the like), or secondary user equipment devices 115B-115*n*. An embodiment disclosed herein may comprise compact uplink traffic aggregation messaging. A compact scheduling request message 510 may be transmitted by a primary UE 115A as a single buffer status report that represents a sum, an aggregate amount, or a value corresponding to, or an indication of, combined traffic of secondary user equipment devices 115B-115*n* that may be connected with primary user equipment 115A in an aggregation group of user equipment devices. Message 510 may be referred to as an aggregated uplink traffic indication or as a first-user-equipment-associated buffer stratus report. Primary UE device 115A may determine a transport block size to use to transport traffic received from secondary UE devices 115B-115*n*. A format disclosed herein of arranging control element indications in a transport block relative to traffic of different secondary user equipment 115B-115*n* may be used to indicate to RAN 105 how traffic in an aggregated traffic transmission is organized in the transport block for the different user equipment devices, including traffic for primary devices 115A and traffic for secondary UE devices 115B-115*n*.

Thus, a primary device using embodiments disclosed herein may facilitate uplink data/traffic scheduling requesting, granting, and transmission procedures to avoid repeating uplink data transmission scheduling for each of the connected secondary devices with uplink traffic available for transmission. In embodiments disclosed herein, a primary UE of an aggregation group of user equipment devices may collect buffer status reports from one or more secondary devices. The primary UE device may then combine individual BSR information contained in buffer status reports received individually from multiple secondary UE devices into an aggregate BSR report to be transmitted towards the network RAN. The RAN may schedule an aggregate uplink resource grant having size to carry the available uplink traffic size of all of the secondary devices based on their corresponding individual BSR information. During or after primary device transmitting of the aggregate BSR report towards the network, the primary UE device may receive uplink traffic from the multiple connected secondary devices, for example via device-device high-capacity links (sidelink, Wi-Fi, WIGIG, etc.).

To facilitate the transmitting of traffic of multiple secondary user equipment, a primary user equipment may generate multiple medium access control elements ("MAC-CE"), where a MAC-CE is associated with, or appended to, a corresponding uplink data traffic portion received from a secondary user equipment device. Accordingly, one uplink transport block may be used to transmit, by a primary user equipment, portions of multiple traffic flows and multiple associated multiple MAC-CEs corresponding to respective multiple secondary user equipment devices. The multiple MAC-CE indications in a single transport block indicates to a RAN node receiving the single transport block from the primary user equipment multiple traffic portions of multiple secondary user equipment that are being transmitted in the transport block according to a granted uplink resource. Thus, the RAN becomes 'aware' of the multiple traffic portions as belonging to one or more of the secondary user equipment devices despite multiple traffic flows, or portions thereof, being transmitted in a single transport block from the primary user equipment device. Accordingly, using embodiments disclosed herein, uplink traffic from multiple secondary user equipment devices may be efficiently transported via high-capacity links, either high-capacity links from the secondary to primary devices, or links from the primary device to the network RAN that may be significantly of higher capacity that a link directly from the secondary user equipment devices directly to the RAN, thus improving battery performance at a primary user equipment and improving overall uplink spectral efficiency in transporting uplink traffic from the user equipment devices to the RAN.

Using embodiments described in reference to FIG. 2A—FIG. 4, a primary device may perform compact random access and network RRC connection establishment on behalf of multiple connected secondary devices, but the uplink traffic may still be transmitted from the secondary devices themselves. In such an embodiment, a primary device of an aggregation group of user equipment devices may compile multiple individual RRC connection messages for respective multiple secondary user equipment devices and transmit the individual RRC connection messages to each of the secondary devices. Instead of secondary user equipment devices transmitting their respective data traffic, even if the secondary user equipment devices received RRC connection resource indications from a primary user equipment, in another embodiment, the primary device may also transmit to the serving RAN the uplink data traffic from the secondary devices.

Accordingly, as shown in FIG. 5A, primary user equipment 115A may request, or receive, buffer status reporting information 507 from each of connected secondary devices 115B-115n (e.g., secondary devices that are part of an aggregation group with the primary UE 115A user equipment). Each received BSR information report 507 may indicate to the primary user equipment 115A an approximate amount of traffic 505 that may be stored in a buffer 504 of the respective secondary user equipment devices and that may be available for uplink transmission to RAN 105. (Shaded blocks in buffers 504B-504n represent traffic 505B-505n available to be transmitted from corresponding user equipment device 115B-115n to RAN 105.) Based on BSR information reports 507B-507n received from secondary devices 115B-115n, primary device 115A may combine the received BSR information and determine/generate an aggregate BSR report 510, which may be referred to as an aggregated uplink traffic indication, to be transmitted to RAN 105 for determination of an aggregate uplink resource size that is sufficiently sized to carry available uplink traffic 505B-505n stored in buffers 504B-504n, as well as traffic that may be stored in a buffer 504A at primary user equipment (which primary device traffic is not shown with shaded blocks to reduce congestion in the figure and also because primary UE 115A does not need to send itself a buffer status report to determine how much traffic may be stored in buffer 504A). RAN 105 may transmit an aggregation information indication message 515 that may indicate one or more uplink resources 517 (e.g., time, frequency, size, or duration) to be used by primary UE 115A to transmit aggregated uplink traffic to the RAN. Aggregation information indication message 515 may comprise uplink transport block configuration information 518 described in reference to FIG. 5B.

Figure 5B:
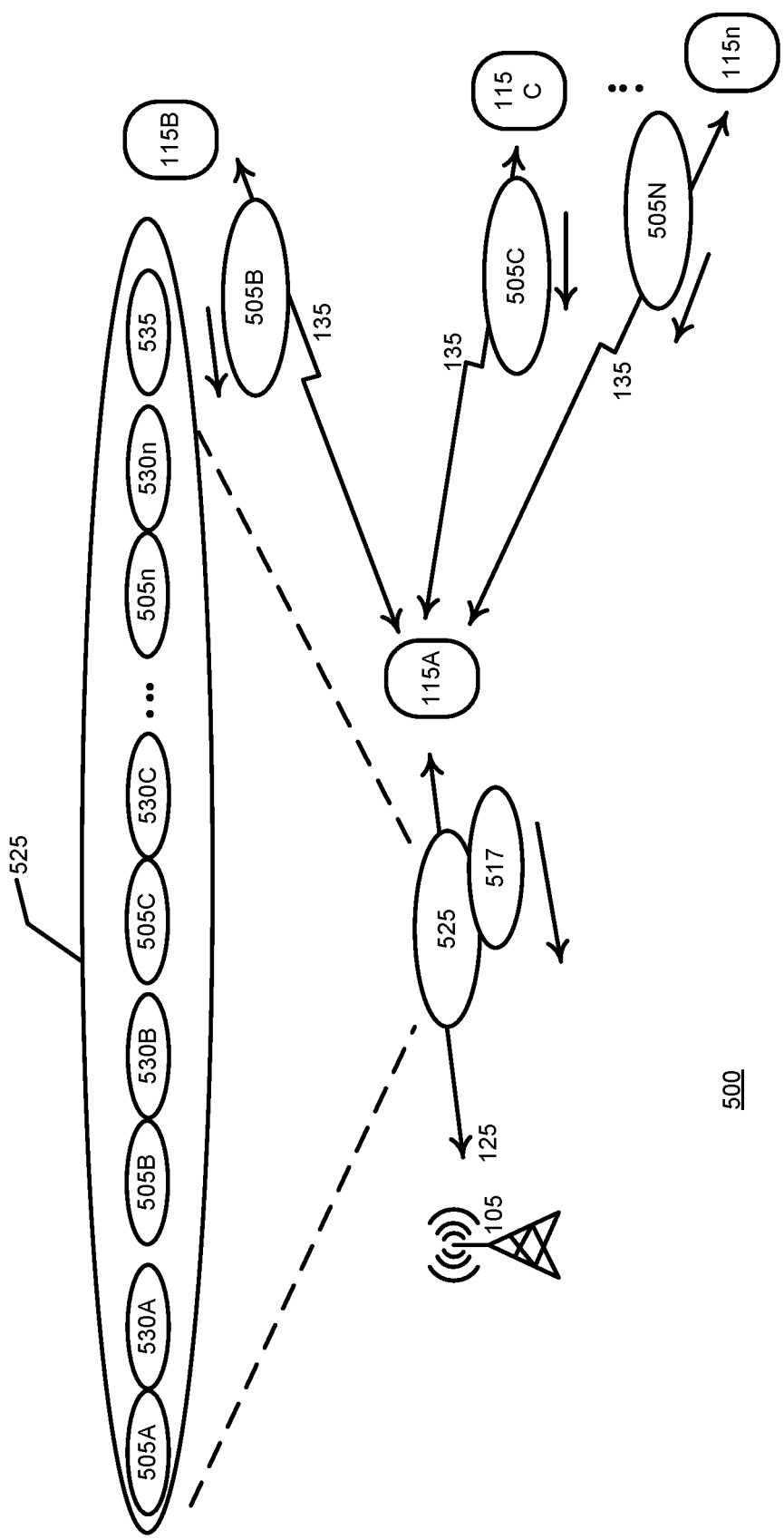
FIG. 5B illustrates an environment with a relay user equipment to relay uplink data traffic from a remote user equipment in an uplink transport block.

As shown in FIG. 5B during or after primary user equipment device 115A transmits aggregate BSR report 510 to network RAN 105, the primary device may receive uplink data traffic 505B-505n from multiple connected secondary devices 115B-115n via, for example, device-device high-capacity links (e.g., sidelink, Wi-Fi, WIGIG, etc.). Primary UE device 115A may generate MAC-CEs 530A-530n, where each MAC-CE may be appended, in a aggregation payload message, to each of uplink traffic portions 505B-505n (and to traffic 505A of primary device 115A that may be ready for transmission to RAN 105) received from each secondary device 115B-115n. It will be appreciated that other configured arrangements of a MAC-CE 530 relative to its corresponding uplink traffic portion 505 may be used instead of a MAC-CE being appended to its corresponding traffic portion in a aggregation payload message, which may be transported in an aggregated traffic transport block 525. Reference to aggregated traffic transport block 525 may be a reference to an aggregation payload message that comprises multiple traffic portions 505 and corresponding MAC-CEs. As shown in FIG. 5B, MAC-CEs 530A-530n are shown touching their respective traffic portions 505A-505n to indicate correspondence of a MAC-CE to a given uplink traffic portion, but a MAC-CE does not necessarily need to be adjacent to a corresponding traffic portion in transport block 525.

Accordingly, a single uplink transport block 525 may be transmitted by primary device 115A with multiple MAC-CEs and traffic portions corresponding thereto. MAC-CEs may indicate to RAN 115A granted uplink resource sets (e.g., resources granted in uplink grant information 220 described in reference to FIG. 2B) that are used to transmit secondary-device-associated traffic, making RAN 105 'aware' of the secondary device's traffic transmissions despite the traffic of the secondary devices being transmitted from primary device UE 115A in a single transport block 525 according to a resource granted to UE 115A in aggregation information indication message 515; the size of transport block 525 may be selected based on a size of a sum of traffic 505A-505n or based on an aggregation block size indicated in aggregation information indication message 515. The size of transport block 525 may be determined from a configured table that associates aggregated traffic size ranges or amount ranges, with corresponding transport block sizes. It will be appreciated that primary device 115A has an uplink buffer capacity that can buffer/store received uplink traffic 505 from the multiple connected secondary devices and uplink traffic that may be buffered at the primary UE itself. Primary UE 115A may regulate how many secondary devices UE115B-115n may be simultaneously connected to the primary UE such that a buffer size of the primary UE can accommodate traffic from secondary UE devices 115B-115n. Thus, uplink traffic from aggregated user equipment devices may be handled via high-capacity links between secondary devices 15B-115n and primary device 115A and via a link, or link, from the primary device to network RAN 105 to improve spectral efficiency of transmission of uplink traffic. Performance benefits may comprise improved battery performance of user equipment of the aggregation group, latency reduction, or higher achievable capacity due to the ultra-high-capacity device-to-device links and better network channel conditions of the primary devices.

Depending on radio functionality capability of primary device 115A (e.g., multiple radio frequency ("RF") chains), whether simultaneously during the transmission of the aggregated BSR report 510 or before or after, primary device 115A may receive uplink traffic 505B-505n from secondary devices 115B-115n via broadband device-to-device links. If primary device 115A is equipped with multiple RF chains, such that the primary UE can transmit and receive simultaneously, uplink traffic latency may be significantly reduced because secondary devices may be able to initiate uplink transmission to the primary device while the primary device is requesting resources for aggregated uplink scheduling. Accordingly, the primary device may generate several MAC-CEs, where each indicates a certain secondary device, or device identifier, and may append the MAC-CEs to the uplink aggregated portions. The multiple MAC-CEs facilitate RAN 105 determining secondary UE devices 115B-115n that correspond to uplink traffic transmitted in a transport block 525 from primary device 115A.

To facilitate efficient multi-MAC-CE transport block detection at the RAN node 105, primary UE 115A may notify the RAN node before transmitting an aggregated traffic transport block 525 that the primary UE may be preparing to transmit multi-MAC-CE transport blocks to the RAN. Otherwise, RAN node 105 might attempt decoding a transport block using all decoding possibilities including all multi-MAC-CE possibilities, which could result in wasteful use of processing resources at the RAN. In an embodiment, RAN 105 may impose on primary UE 115A a maximum allowable traffic aggregation limit, which may reduce a number of decoding possibilities for the RAN to perform on a multi-MAC-CE transport block 525. Thus, upon primary device 115A establishing a connection with RAN 105, the primary UE may declare corresponding device-specific capability information, which may include indications of a number of aggregated uplink traffic portions and a number of respective MAC-CEs to be transmitted in a single uplink transport block. Accordingly, RAN node 105 may configure uplink aggregation-capable primary UE 115A with uplink transport block configuration information 518, which may be transported in aggregation information indication message 515.

Uplink transport block configuration information 518 may comprise a maximum allowable number of MAC-CEs within a transmitted uplink transport 525, where each MAC-CE corresponds to a portion of aggregated traffic corresponding to a secondary UE 115B-115n. Uplink transport block configuration information may comprise a minimum threshold of aggregation traffic volume to be satisfied before primary UE 115A activates/requests uplink traffic aggregation from secondary devices. Satisfying such a threshold before implementing aggregation of uplink traffic may facilitate, for example, primary UE in only activating uplink traffic aggregation when there is a small amount of traffic volume from one or more secondary UEs 115B-115n. Transmitting small traffic portions from the one or more secondary UEs between the primary UE and RAN 105 in an aggregated manner may reduce overhead that might otherwise be used in transmitting small traffic portions in separate transport blocks because less total control padding 535 may be added to an aggregated traffic transport block 525 than may be added to multiple separate transport blocks that might be used to transmit the separate traffic portions if uplink data aggregation transmission were not used.

Figure 6:
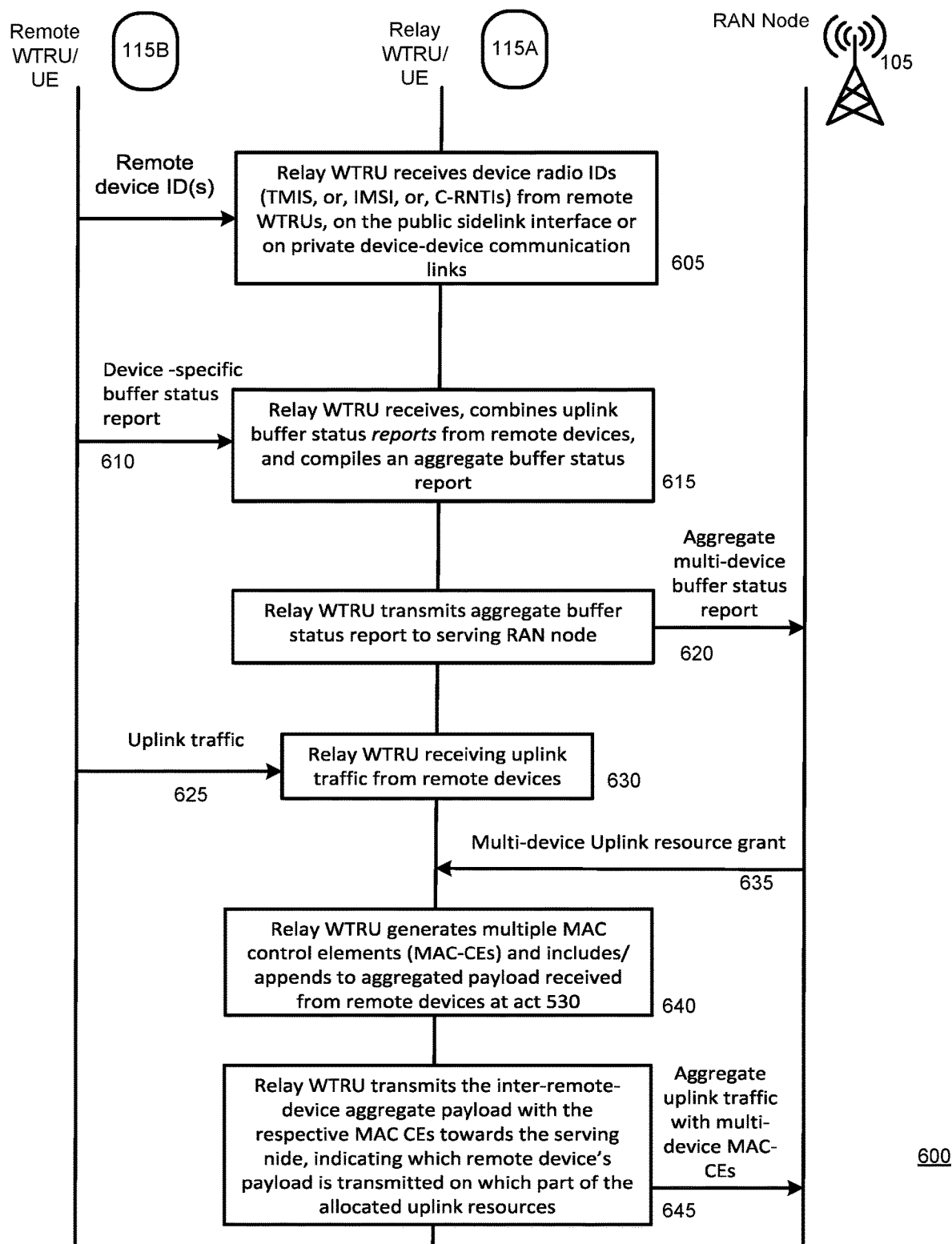
FIG. 6 illustrates a timing diagram of an example method to relay uplink data traffic.

Turning now to FIG. 6, the figure illustrates a timing diagram of an example method embodiment 600 to relay aggregated uplink traffic. At act primary/relay UE/WTRU 115A receives device radio identifiers (e.g., TMSI, IMSI, or C-RNTI) from remote/secondary UE 115B via, for example, public sidelink interface or on private device-device communication links. At act 610, secondary EU 115B transmits to UE 115A uplink buffer status reports. At act 615, UE 115A receives the individual buffer status report transmitted at act 610 and compiles an aggregate uplink traffic buffer status report, that may indicate a sum of uplink traffic sizes from remote user equipment UE 115B and other remote UE devices that may be in an aggregation group with primary UE 115A and secondary UE 115B. At act 620, primary/relay UE/WTRU 115A transmits the aggregate uplink traffic buffer status report to serving RAN node 105. At act 625, secondary UE 115B transmits, and at act 630 primary/relay UE 115A receives, uplink traffic. At act 635, RAN 105 transmits to primary UE 115A an uplink resource grant message comprising, for example, message 515 described in reference to FIG. 5A.

Continuing with description of FIG. 6, at act 640, primary/relay UE/WTRU 115A generates/compiles multiple MAC control elements (MAC-CEs) corresponding to traffic flows received from UE 115B, or other secondary user equipment devices, at act 630. Primary UE 115A appends, or otherwise arranges, MAC-CEs with corresponding traffic portions received from remote/secondary UE device 115B, and other secondary devices, if any, in the aggregation group, in a aggregated transport block, such as transport block 525 described in reference to FIG. 5B. At act 645 in FIG. 6, primary/relay UE/WTRU 115A transmits the aggregate traffic payload and corresponding MAC-CEs in a single transport block to RAN 105, wherein the MAC-CEs indicate which remote device's payload is transmitted on which part of the allocated uplink resources 517 that may have been granted in a message 515 described in reference to FIG. 5A. RAN 105 receives an aggregation payload message transported in the transport block transmitted at act 645 and processes traffic portions contained therein according to the corresponding MAC-CEs in the aggregated traffic block.

Figure 7:
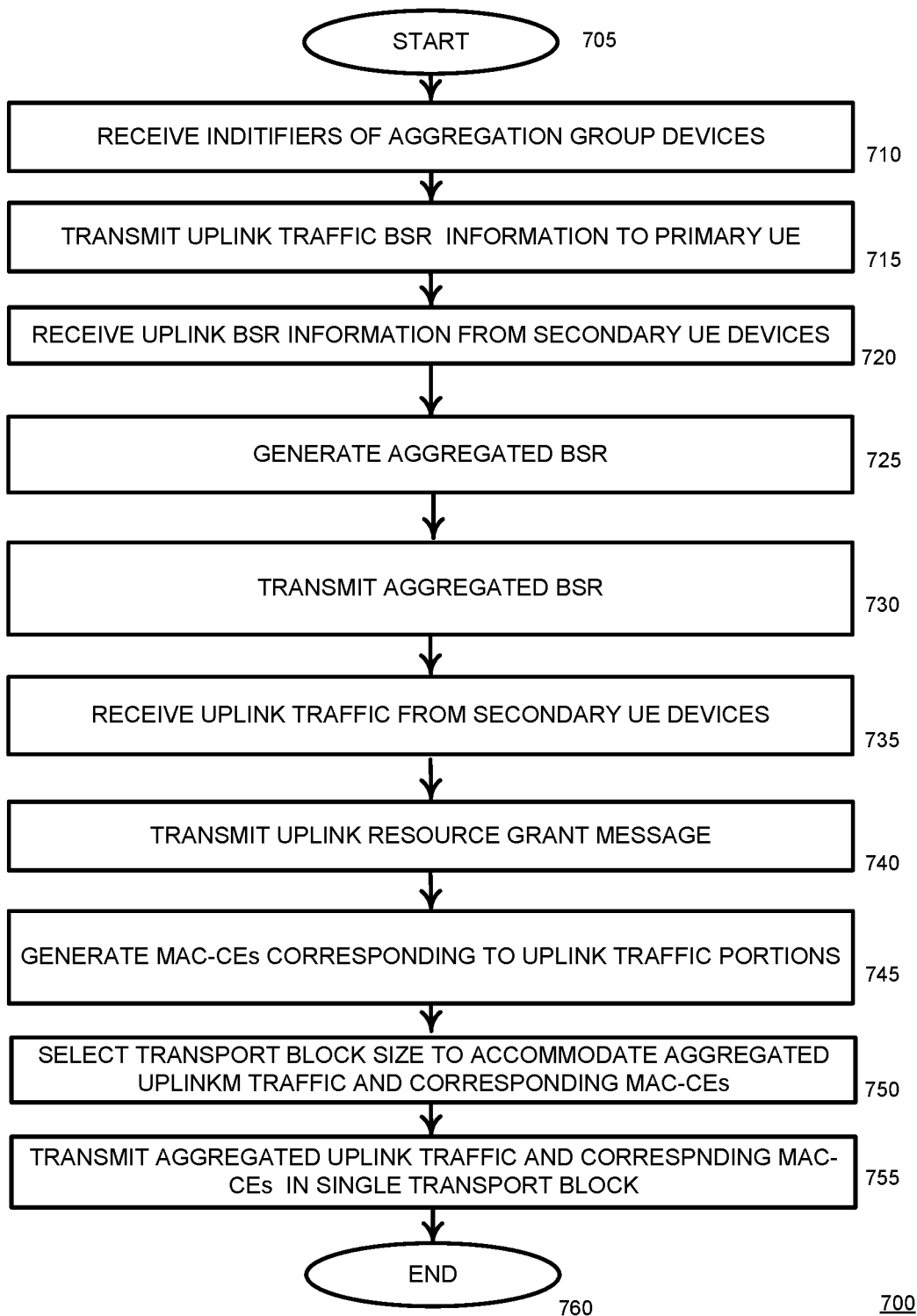
FIG. 7 illustrates a flow diagram of an example method to relay uplink traffic.

Turning now to FIG. 7, the figure illustrates a flow diagram of an example embodiment method 700 to aggregate and relay, by a primary user equipment, aggregated uplink traffic of secondary user equipment, as well as traffic of the primary user equipment that is part of the aggregation group, to a serving RAN. Method 700 begins at act 705. At act 710, the primary user equipment receives identifiers of secondary user equipment devices in the aggregation group. At act 715, the secondary user equipment devices transmit uplink traffic buffer status report information to the primary user equipment. The buffer status report information of the secondary user equipment devices may indicate an amount, or size, of data traffic that is buffered at the respective secondary user equipment devices. At act 720 the primary user equipment receives the multiple uplink buffer status report information transmissions that were transmitted from the secondary user equipment devices at act 715.

At act 725, the primary user equipment may generate an aggregated buffer status report, which may be referred to as an aggregated uplink traffic indication. At act 730, the primary user equipment transmits to a serving RAN the aggregated buffer status report that was generated at act 725.

At act 735, the primary user equipment may receive uplink traffic from the secondary user equipment devices that may have been buffered at the secondary user equipment devices and that corresponds to the secondary buffer status report information that was transmitted at act 720.

Responsive to the aggregated buffer status report that was transmitted at act 730, the serving RAN may transmit back to the primary user equipment an aggregated information indication message at act 740. The aggregated information indication message may comprise information to be used by the primary user equipment in transmitting an aggregation payload message that includes traffic receive from the secondary user equipment devices at act 735.

At act 745, the primary user equipment generates medium access control control elements corresponding to portions of the uplink traffic that was received at act 735. A separate medium access control control element may be generated at act 745 for each traffic flow, each portion of a traffic flow, each packet of a traffic flow, or each other form of traffic that was received from each secondary user equipment at act 735. The primary user equipment may generate as many medium access control control elements as there were secondary user equipment devices that transmitted uplink traffic to the primary user equipment at act 735. The primary user equipment may combined the medium access control control elements with the traffic received at act 735 in an aggregation payload message. The primary user equipment may select a transport block to be used as an aggregated traffic transport block to carry the aggregation payload message. The primary user equipment may select a transport block size at act 750 to carry the aggregation payload message based on the size of the aggregation payload message. Thus, a transport block size may be selected that is as small as possible, but still larger than, or as large as, an amount, or size, of uplink traffic received from the secondary user equipment devices at act 735 plus the size of the multiple medium access control control elements corresponding thereto. At act 755, the primary user equipment transmits the aggregated traffic transport block that contains the aggregation payload message to the serving RAN. Method 700 ends at act 760

Figure 8:
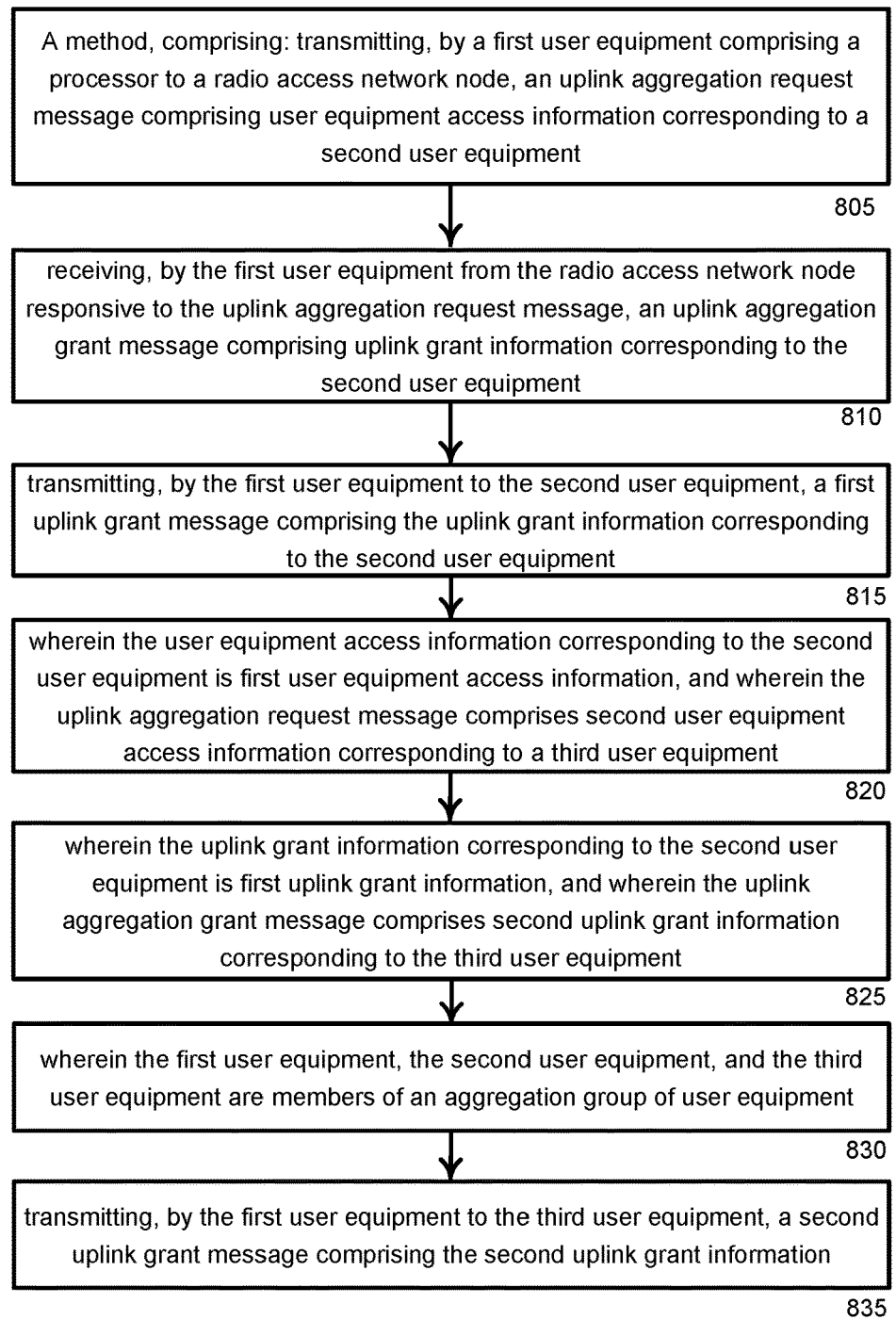
FIG. 8 illustrates a block diagram of an example method.

Turning now to FIG. 8, the figure illustrates an example embodiment method 800 comprising at block 805 transmitting, by a first user equipment comprising a processor to a radio access network node, an uplink aggregation request message comprising user equipment access information corresponding to a second user equipment; at block 810 receiving, by the first user equipment from the radio access network node responsive to the uplink aggregation request message, an uplink aggregation grant message comprising uplink grant information corresponding to the second user equipment; at block 815 transmitting, by the first user equipment to the second user equipment, a first uplink grant message comprising the uplink grant information corresponding to the second user equipment; at block 820 wherein the user equipment access information corresponding to the second user equipment is first user equipment access information, and wherein the uplink aggregation request message comprises second user equipment access information corresponding to a third user equipment; at block 825 wherein the uplink grant information corresponding to the second user equipment is first uplink grant information, and wherein the uplink aggregation grant message comprises second uplink grant information corresponding to the third user equipment; at block 830 wherein the first user equipment, the second user equipment, and the third user equipment are members of an aggregation group of user equipment; and at block 835 transmitting, by the first user equipment to the third user equipment, a second uplink grant message comprising the second uplink grant information.

Figure 9:
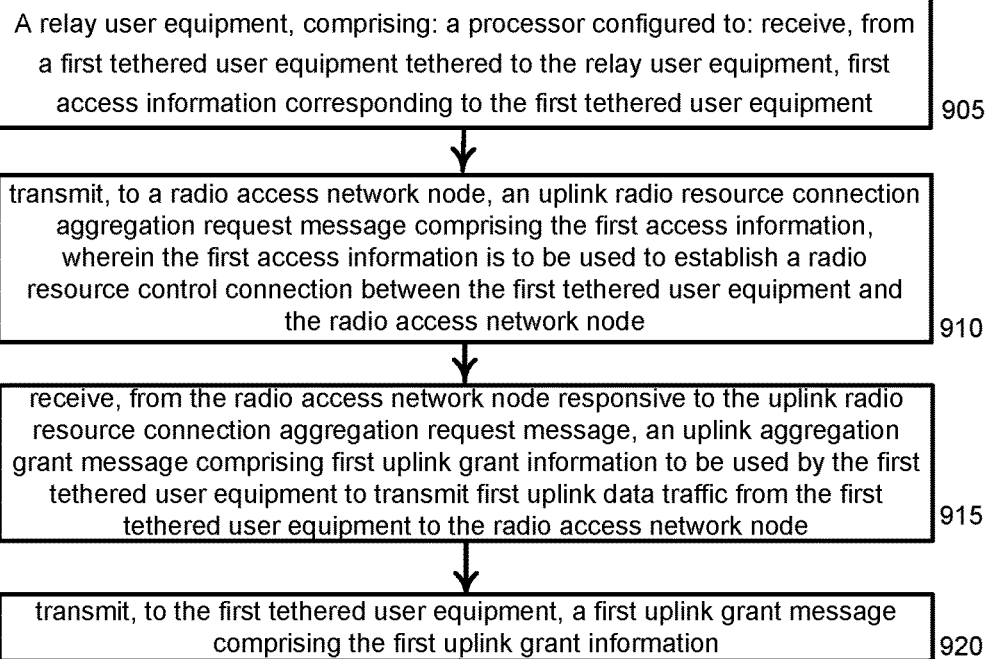
FIG. 9 illustrates a block diagram of an example relay user equipment.

Turning now to FIG. 9, the figure illustrates an example relay user equipment 900, comprising at block 905 a processor configured to: receive, from a first tethered user equipment tethered to the relay user equipment, first access information corresponding to the first tethered user equipment; at block 910 transmit, to a radio access network node, an uplink radio resource connection aggregation request message comprising the first access information, wherein the first access information is to be used to establish a radio resource control connection between the first tethered user equipment and the radio access network node; at block 915 receive, from the radio access network node responsive to the uplink radio resource connection aggregation request message, an uplink aggregation grant message comprising first uplink grant information to be used by the first tethered user equipment to transmit first uplink data traffic from the first tethered user equipment to the radio access network node; and at block 920 transmit, to the first tethered user equipment, a first uplink grant message comprising the first uplink grant information.

Figure 10:
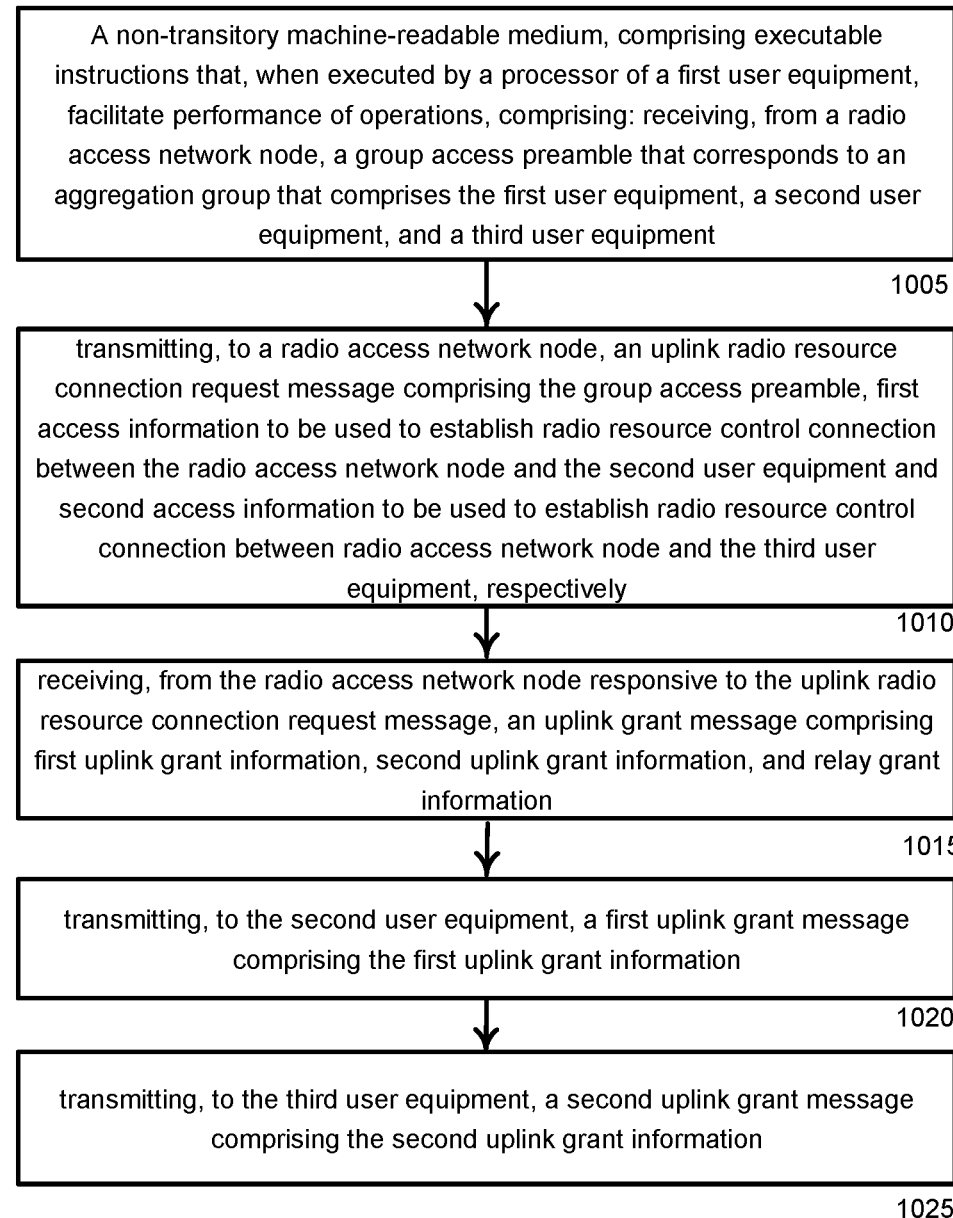
FIG. 10 illustrates a block diagram of an example non-transitory machine-readable medium.

Turning now to FIG. 10, the figure illustrates a non-transitory machine-readable medium 1000 comprising at block 1005 executable instructions that, when executed by a processor of a first user equipment, facilitate performance of operations, comprising: receiving, from a radio access network node, a group access preamble that corresponds to an aggregation group that comprises the first user equipment, a second user equipment, and a third user equipment; at block 1010 transmitting, to a radio access network node, an uplink radio resource connection request message comprising the group access preamble, first access information to be used to establish radio resource control connection between the radio access network node and the second user equipment and second access information to be used to establish radio resource control connection between radio access network node and the third user equipment, respectively; at block 1015 receiving, from the radio access network node responsive to the uplink radio resource connection request message, an uplink grant message comprising first uplink grant information, second uplink grant information, and relay grant information; at block 1020 transmitting, to the second user equipment, a first uplink grant message comprising the first uplink grant information; and at block 1025 transmitting, to the third user equipment, a second uplink grant message comprising the second uplink grant information.

Figure 11:
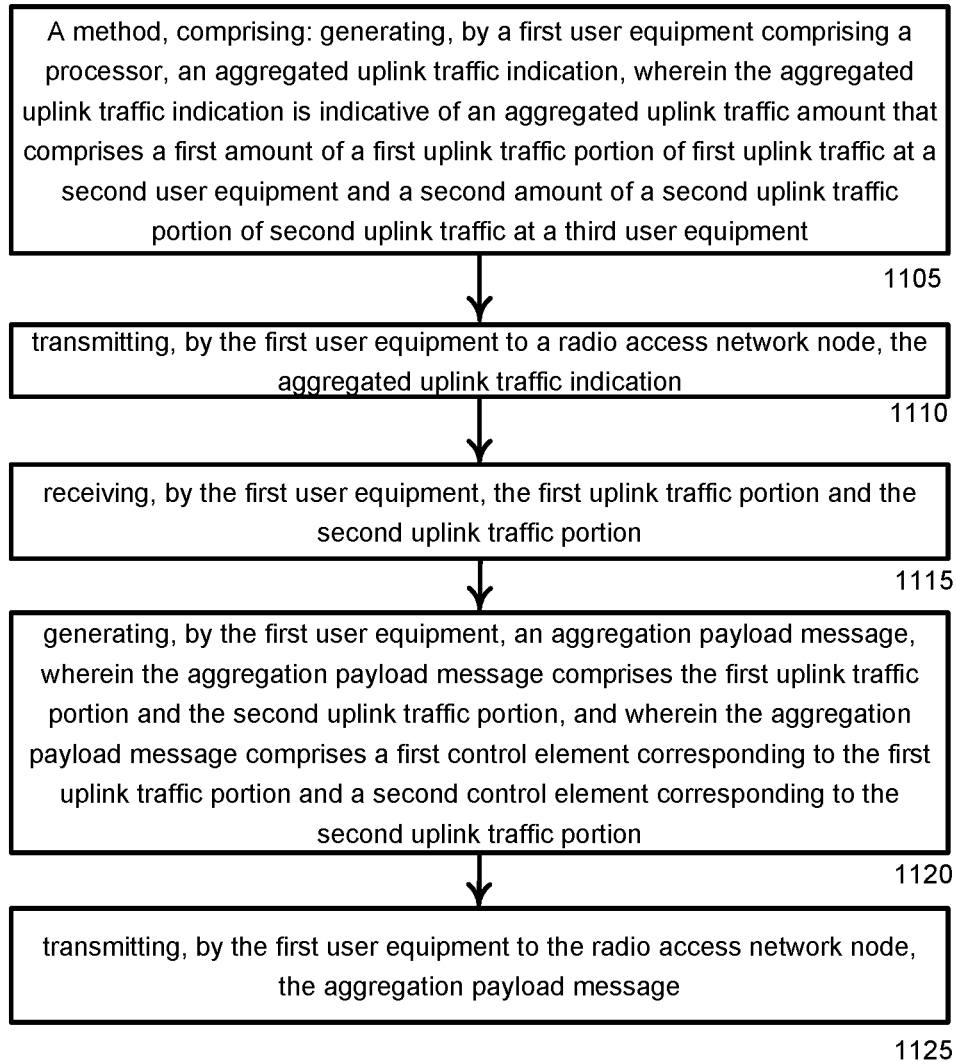
FIG. 11 illustrates a block diagram of an example method.

Turning now to FIG. 11, the figure illustrates an example embodiment method 1100 comprising at block 1105 generating, by a first user equipment comprising a processor, an aggregated uplink traffic indication, wherein the aggregated uplink traffic indication is indicative of an aggregated uplink traffic amount that comprises a first amount of a first uplink traffic portion of first uplink traffic at a second user equipment and a second amount of a second uplink traffic portion of second uplink traffic at a third user equipment; at block 1110 transmitting, by the first user equipment to a radio access network node, the aggregated uplink traffic indication; at block 1115 receiving, by the first user equipment, the first uplink traffic portion and the second uplink traffic portion; at block 1120 generating, by the first user equipment, an aggregation payload message, wherein the aggregation payload message comprises the first uplink traffic portion and the second uplink traffic portion, and wherein the aggregation payload message comprises a first control element corresponding to the first uplink traffic portion and a second control element corresponding to the second uplink traffic portion; and at block 1125 transmitting, by the first user equipment to the radio access network node, the aggregation payload message.

Figure 12:
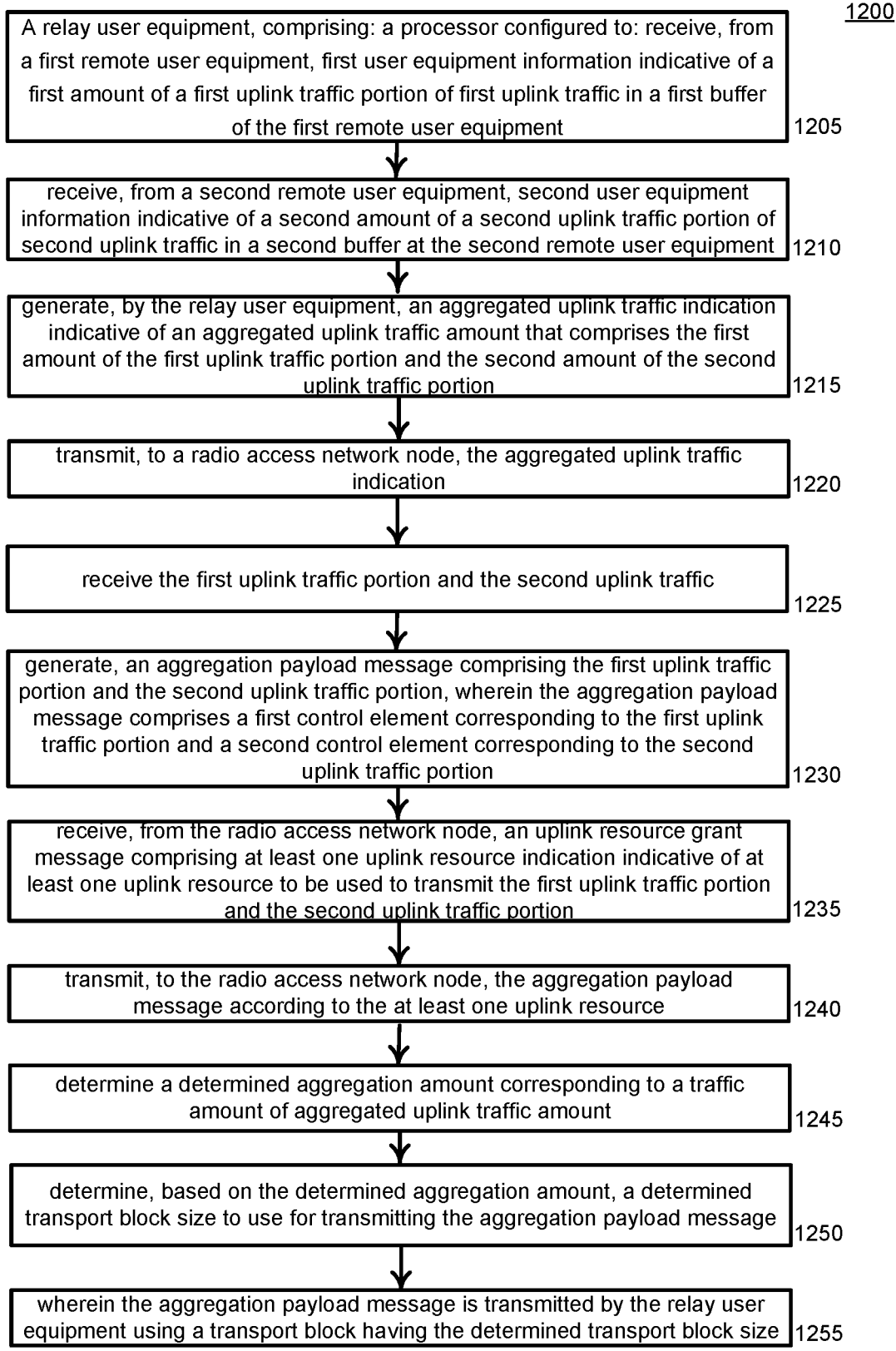
FIG. 12 illustrates a block diagram of an example relay user equipment.

Turning now to FIG. 12, the figure illustrates an example relay user equipment 1200, comprising at block 1205 a processor configured to: receive, from a first remote user equipment, first user equipment information indicative of a first amount of a first uplink traffic portion of first uplink traffic in a first buffer of the first remote user equipment; at block 1210 receive, from a second remote user equipment, second user equipment information indicative of a second amount of a second uplink traffic portion of second uplink traffic in a second buffer at the second remote user equipment; at block 1215 generate, by the relay user equipment, an aggregated uplink traffic indication indicative of an aggregated uplink traffic amount that comprises the first amount of the first uplink traffic portion and the second amount of the second uplink traffic portion; at block 1220 transmit, to a radio access network node, the aggregated uplink traffic indication; at block 1225 receive the first uplink traffic portion and the second uplink traffic; at block 1230 generate, an aggregation payload message comprising the first uplink traffic portion and the second uplink traffic portion, wherein the aggregation payload message comprises a first control element corresponding to the first uplink traffic portion and a second control element corresponding to the second uplink traffic portion; at block 1235 receive, from the radio access network node, an uplink resource grant message comprising at least one uplink resource indication indicative of at least one uplink resource to be used to transmit the first uplink traffic portion and the second uplink traffic portion; at block 1240 transmit, to the radio access network node, the aggregation payload message according to the at least one uplink resource; at block 1245 determine a determined aggregation amount corresponding to a traffic amount of aggregated uplink traffic amount; at block 1250 determine, based on the determined aggregation amount, a determined transport block size to use for transmitting the aggregation payload message; and at block 1255 wherein the aggregation payload message is transmitted by the relay user equipment using a transport block having the determined transport block size.

Turning now to FIG. 13, the figure illustrates a non-transitory machine-readable medium 1300 comprising at block 1305 executable instructions that, when executed by a processor of a first user equipment, facilitate performance of operations, comprising: receiving, from a second user equipment, a second-user-equipment-associated buffer status report indicative of a first size of a first uplink traffic portion at a second user equipment; at block 1310 receiving, from a third user equipment, a third-user-equipment-associated buffer status report indicative of a second size of a second uplink traffic portion at a third user equipment; at block 1315 generating a first-user-equipment-associated buffer stratus report based on the second-user-equipment-associated buffer status report and the third-user-equipment-associated buffer status report; at block 1320 transmitting, to a radio access network node, the first-user-equipment-associated buffer stratus report; at block 1325 receiving, the first uplink traffic portion and the second uplink traffic portion from the second user equipment and the third user equipment, respectively; at block 1330 generating, an aggregation payload message comprising the first uplink traffic and the second uplink traffic, wherein the aggregation payload message comprises a first medium access control control element indicative of the first uplink traffic portion within the aggregation payload message and a second medium access control control element indicative of the second uplink traffic portion within the aggregation payload message; at block 1335 receiving, from the radio access network node, an uplink resource grant message comprising at least one uplink resource indication indicative of at least one uplink resource to be used to transmit, by the first user equipment, a first-user-equipment-associated-amount of uplink traffic corresponding to the first-user-equipment-associated buffer stratus report; at block 1340 transmitting, to the radio access network node, the aggregation payload message according to the at least one uplink resource; and at block 1345 wherein the first user equipment, the second user equipment, and the third user equipment are members of an aggregation group.

Figure 14:
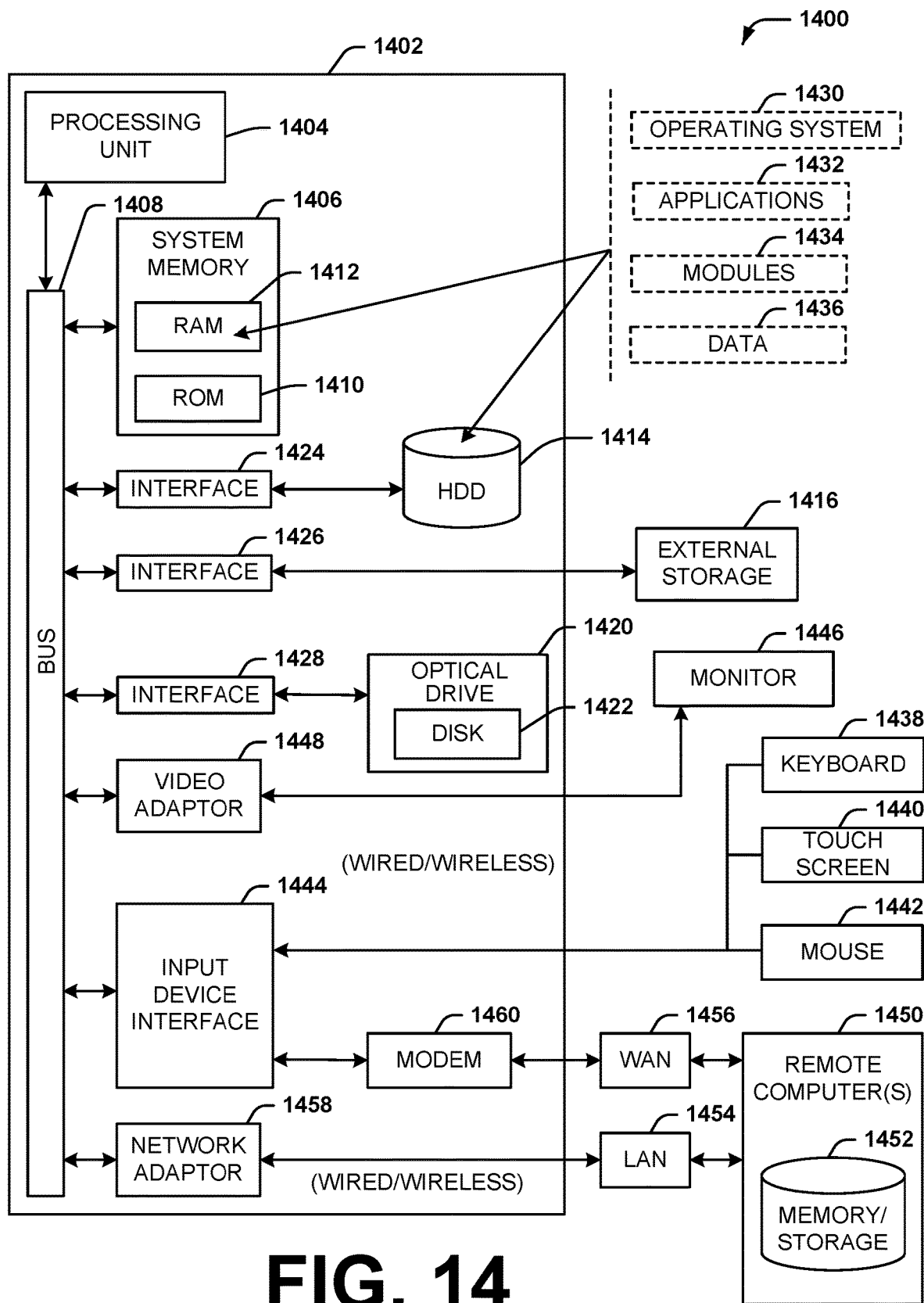
FIG. 14 illustrates an example computer environment.

In order to provide additional context for various embodiments described herein, FIG. 14 and the following discussion are intended to provide a brief, general description of a suitable computing environment 1400 in which various embodiments of the embodiment described herein can be implemented. While embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the methods can be practiced with other computer system configurations, including single-processor or multiprocessor computer systems, minicomputers, mainframe computers, IoT devices, distributed computing systems, as well as personal computers, hand-held computing devices, microprocessor-based or programmable consumer electronics, and the like, each of which can be operatively coupled to one or more associated devices.

The embodiments illustrated herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 14, the example environment 1400 for implementing various embodiments of the aspects described herein includes a computer 1402, the computer 1402 including a processing unit 1404, a system memory 1406 and a system bus 1408. The system bus 1408 couples system components including, but not limited to, the system memory 1406 to the processing unit 1404. The processing unit 1404 can be any of various commercially available processors and may include a cache memory. Dual microprocessors and other multi-processor architectures can also be employed as the processing unit 1404.

The system bus 1408 can be any of several types of bus structure that can further interconnect to a memory bus (with or without a memory controller), a peripheral bus, and a local bus using any of a variety of commercially available bus architectures. The system memory 1406 includes ROM 1410 and RAM 1412. A basic input/output system (BIOS) can be stored in a non-volatile memory such as ROM, erasable programmable read only memory (EPROM), EEPROM, which BIOS contains the basic routines that help to transfer information between elements within the computer 1402, such as during startup. The RAM 1412 can also include a high-speed RAM such as static RAM for caching data.

Computer 1402 further includes an internal hard disk drive (HDD) 1414 (e.g., EIDE, SATA), one or more external storage devices 1416 (e.g., a magnetic floppy disk drive (FDD) 1416, a memory stick or flash drive reader, a memory card reader, etc.) and an optical disk drive 1420 (e.g., which can read or write from a CD-ROM disc, a DVD, a BD, etc.). While the internal HDD 1414 is illustrated as located within the computer 1402, the internal HDD 1414 can also be configured for external use in a suitable chassis (not shown). Additionally, while not shown in environment 1400, a solid-state drive (SSD) could be used in addition to, or in place of, an HDD 1414. The HDD 1414, external storage device(s) 1416 and optical disk drive 1420 can be connected to the system bus 1408 by an HDD interface 1424, an external storage interface 1426 and an optical drive interface 1428, respectively. The interface 1424 for external drive implementations can include at least one or both of Universal Serial Bus (USB) and Institute of Electrical and Electronics Engineers (IEEE) 1194 interface technologies. Other external drive connection technologies are within contemplation of the embodiments described herein.

The drives and their associated computer-readable storage media provide nonvolatile storage of data, data structures, computer-executable instructions, and so forth. For the computer 1402, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1412, including an operating system 1430, one or more application programs 1432, other program modules 1434 and program data 1436. All or portions of the operating system, applications, modules, and/or data can also be cached in the RAM 1412. The systems and methods described herein can be implemented utilizing various commercially available operating systems or combinations of operating systems.

Computer 1402 can optionally comprise emulation technologies. For example, a hypervisor (not shown) or other intermediary can emulate a hardware environment for operating system 1430, and the emulated hardware can optionally be different from the hardware illustrated in FIG. 14. In such an embodiment, operating system 1430 can comprise one virtual machine (VM) of multiple VMs hosted at computer 1402. Furthermore, operating system 1430 can provide runtime environments, such as the Java runtime environment or the .NET framework, for applications 1432. Runtime environments are consistent execution environments that allow applications 1432 to run on any operating system that includes the runtime environment. Similarly, operating system 1430 can support containers, and applications 1432 can be in the form of containers, which are lightweight, standalone, executable packages of software that include, e.g., code, runtime, system tools, system libraries and settings for an application.

Further, computer 1402 can comprise a security module, such as a trusted processing module (TPM). For instance, with a TPM, boot components hash next in time boot components, and wait for a match of results to secured values, before loading a next boot component. This process can take place at any layer in the code execution stack of computer 1402, e.g., applied at the application execution level or at the operating system (OS) kernel level, thereby enabling security at any level of code execution.

A user can enter commands and information into the computer 1402 through one or more wired/wireless input devices, e.g., a keyboard 1438, a touch screen 1440, and a pointing device, such as a mouse 1442. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1404 through an input device interface 1444 that can be coupled to the system bus 1408, but can be connected by other interfaces, such as a parallel port, an IEEE 1194 serial port, a game port, a USB port, an IR interface, a BLUETOOTH® interface, etc.

A monitor 1446 or other type of display device can be also connected to the system bus 1408 via an interface, such as a video adapter 1448. In addition to the monitor 1446, a computer typically includes other peripheral output devices (not shown), such as speakers, printers, etc.

The computer 1402 can operate in a networked environment using logical connections via wired and/or wireless communications to one or more remote computers, such as a remote computer(s) 1450. The remote computer(s) 1450 can be a workstation, a server computer, a router, a personal computer, portable computer, microprocessor-based entertainment appliance, a peer device or other common network node, and typically includes many or all of the elements described relative to the computer 1402, although, for purposes of brevity, only a memory/storage device 1452 is illustrated. The logical connections depicted include wired/wireless connectivity to a local area network (LAN) 1454 and/or larger networks, e.g., a wide area network (WAN) 1456. Such LAN and WAN networking environments are commonplace in offices and companies, and facilitate enterprise-wide computer networks, such as intranets, all of which can connect to a global communications network, e.g., the internet.

When used in a LAN networking environment, the computer 1402 can be connected to the local network 1454 through a wired and/or wireless communication network interface or adapter 1458. The adapter 1458 can facilitate wired or wireless communication to the LAN 1454, which can also include a wireless access point (AP) disposed thereon for communicating with the adapter 1458 in a wireless mode.

When used in a WAN networking environment, the computer 1402 can include a modem 1460 or can be connected to a communications server on the WAN 1456 via other means for establishing communications over the WAN 1456, such as by way of the internet. The modem 1460, which can be internal or external and a wired or wireless device, can be connected to the system bus 1408 via the input device interface 1444. In a networked environment, program modules depicted relative to the computer 1402 or portions thereof, can be stored in the remote memory/storage device 1452. It will be appreciated that the network connections shown are example and other means of establishing a communications link between the computers can be used.

When used in either a LAN or WAN networking environment, the computer 1402 can access cloud storage systems or other network-based storage systems in addition to, or in place of, external storage devices 1416 as described above. Generally, a connection between the computer 1402 and a cloud storage system can be established over a LAN 1454 or WAN 1456 e.g., by the adapter 1458 or modem 1460, respectively. Upon connecting the computer 1402 to an associated cloud storage system, the external storage interface 1426 can, with the aid of the adapter 1458 and/or modem 1460, manage storage provided by the cloud storage system as it would other types of external storage. For instance, the external storage interface 1426 can be configured to provide access to cloud storage sources as if those sources were physically connected to the computer 1402.

The computer 1402 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

Figure 15:
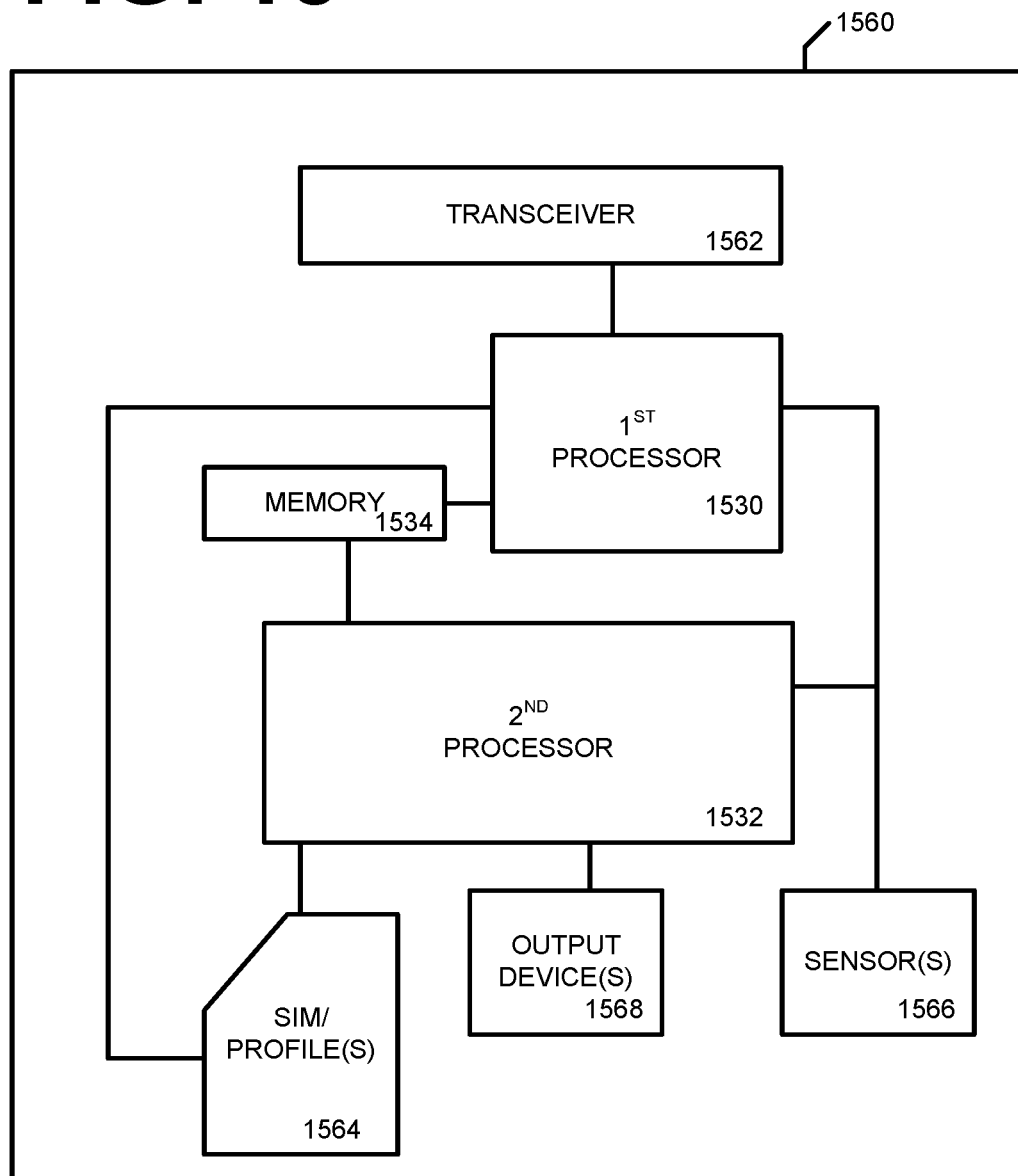
FIG. 15 illustrates a block diagram of an example wireless UE.

Turning to FIG. 15, the figure illustrates a block diagram of an example UE 1560. UE 1560 may comprise a smart phone, a wireless tablet, a laptop computer with wireless capability, a wearable device, a machine device that may facilitate vehicle telematics, a tracking device, remote sensing devices, and the like. UE 1560 comprises a first processor 1530, a second processor 1532, and a shared memory 1534. UE 1560 includes radio front end circuitry 1562, which may be referred to herein as a transceiver, but is understood to typically include transceiver circuitry, separate filters, and separate antennas for facilitating transmission and receiving of signals over a wireless link, such as one or more wireless links 125, 135, and 137 shown in FIG. 1. Furthermore, transceiver 1562 may comprise multiple sets of circuitry or may be tunable to accommodate different frequency ranges, different modulations schemes, or different communication protocols, to facilitate long-range wireless links such as links, device-to-device links, such as links 135, and short-range wireless links, such as links 137.

Continuing with description of FIG. 15, UE 1560 may also include a SIM 1564, or a SIM profile, which may comprise information stored in a memory (memory 34 or a separate memory portion), for facilitating wireless communication with RAN 105 or core network 130 shown in FIG. 1. FIG. 15 shows SIM 1564 as a single component in the shape of a conventional SIM card, but it will be appreciated that SIM 1564 may represent multiple SIM cards, multiple SIM profiles, or multiple eSIMs, some or all of which may be implemented in hardware or software. It will be appreciated that a SIM profile may comprise information such as security credentials (e.g., encryption keys, values that may be used to generate encryption keys, or shared values that are shared between SIM 1564 and another device, which may be a component of RAN 105 or core network 130 shown in FIG. 1). A SIM profile 1564 may also comprise identifying information that is unique to the SIM, or SIM profile, such as, for example, an International Mobile Subscriber Identity ("IMSI") or information that may make up an IMSI.

SIM 1564 is shown coupled to both the first processor portion 1530 and the second processor portion 1532. Such an implementation may provide an advantage that first processor portion 1530 may not need to request or receive information or data from SIM 151564 that second processor 1532 may request, thus eliminating the use of the first processor acting as a 'go-between' when the second processor uses information from the SIM in performing its functions and in executing applications. First processor 1530, which may be a modem processor or a baseband processor, is shown smaller than processor 1532, which may be a more sophisticated application processor, to visually indicate the relative levels of sophistication (i.e., processing capability and performance) and corresponding relative levels of operating power consumption levels between the two processor portions. Keeping the second processor portion 1532 asleep/inactive/in a low power state when UE 1560 does not need it for executing applications and processing data related to an application provides an advantage of reducing power consumption when the UE only needs to use the first processor portion 1530 while in listening mode for monitoring routine configured bearer management and mobility management/maintenance procedures, or for monitoring search spaces that the UE has been configured to monitor while the second processor portion remains inactive/asleep.

UE 1560 may also include sensors 1566, such as, for example, temperature sensors, accelerometers, gyroscopes, barometers, moisture sensors, and the like that may provide signals to the first processor 1530 or second processor 1532. Output devices 1568 may comprise, for example, one or more visual displays (e.g., computer monitors, VR appliances, and the like), acoustic transducers, such as speakers or microphones, vibration components, and the like. Output devices 1568 may comprise software that interfaces with output devices, for example, visual displays, speakers, microphones, touch sensation devices, smell or taste devices, and the like, that are external to UE 1560.

The following glossary of terms given in Table 1 may apply to one or more descriptions of embodiments disclosed herein.

TABLE 1

| Term | Definition |
| --- | --- |
| UE | User equipment |
| WTRU | Wireless transmit receive unit |
| RAN | Radio access network |
| QoS | Quality of service |
| DRX | Discontinuous reception |
| EPI | Early paging indication |
| DCI | Downlink control information |
| SSB | Synchronization signal block |
| RS | Reference signal |
| PDCCH | Physical downlink control channel |
| PDSCH | Physical downlink shared channel |
| MUSIM | Multi-SIM UE |
| SIB | System information block |
| MIB | Master information block |
| eMBB | Enhanced mobile broadband |
| URLLC | Ultra reliable and low latency communications |
| mMTC | Massive machine type communications |
| XR | Anything-reality |
| VR | Virtual reality |
| AR | Augmented reality |
| MR | Mixed reality |
| DCI | Downlink control information |
| DMRS | Demodulation reference signals |
| QPSK | Quadrature Phase Shift Keying |
| WUS | Wake up signal |
| HARQ | Hybrid automatic repeat request |
| RRC | Radio resource control |
| C-RNTI | Connected mode radio network temporary identifier |
| CRC | Cyclic redundancy check |
| MIMO | Multi input multi output |
| UE | User equipment |
| WTRU | Wireless transmit receive unit |
| QCI | QoS Class Identifiers |
| BSR | Buffer status report |
| URLLC | Ultra reliable and low latency communication |
| CBR | Channel busy ratio |
| SCI | Sidelink control information |
| TMIS | Temporary Mobile Subscriber Identity |
| IMSI | International Mobile Subscriber Identity |

The above description includes non-limiting examples of the various embodiments. It is, of course, not possible to describe every conceivable combination of components or methodologies for purposes of describing the disclosed subject matter, and one skilled in the art may recognize that further combinations and permutations of the various embodiments are possible. The disclosed subject matter is intended to embrace all such alterations, modifications, and variations that fall within the spirit and scope of the appended claims.

With regard to the various functions performed by the above-described components, devices, circuits, systems, etc., the terms (including a reference to a "means") used to describe such components are intended to also include, unless otherwise indicated, any structure(s) which performs the specified function of the described component (e.g., a functional equivalent), even if not structurally equivalent to the disclosed structure. In addition, while a particular feature of the disclosed subject matter may have been disclosed with respect to only one of several implementations, such feature may be combined with one or more other features of the other implementations as may be desired and advantageous for any given or particular application.

The terms "exemplary" and/or "demonstrative" or variations thereof as may be used herein are intended to mean serving as an example, instance, or illustration. For the avoidance of doubt, the subject matter disclosed herein is not limited by such examples. In addition, any aspect or design described herein as "exemplary" and/or "demonstrative" is not necessarily to be construed as preferred or advantageous over other aspects or designs, nor is it meant to preclude equivalent structures and techniques known to one skilled in the art. Furthermore, to the extent that the terms "includes," "has," "contains," and other similar words are used in either the detailed description or the claims, such terms are intended to be inclusive—in a manner similar to the term "comprising" as an open transition word—without precluding any additional or other elements.

The term "or" as used herein is intended to mean an inclusive "or" rather than an exclusive "or." For example, the phrase "A or B" is intended to include instances of A, B, and both A and B. Additionally, the articles "a" and "an" as used in this application and the appended claims should generally be construed to mean "one or more" unless either otherwise specified or clear from the context to be directed to a singular form.

The term "set" as employed herein excludes the empty set, i.e., the set with no elements therein. Thus, a "set" in the subject disclosure includes one or more elements or entities. Likewise, the term "group" as utilized herein refers to a collection of one or more entities.

The terms "first," "second," "third," and so forth, as used in the claims, unless otherwise clear by context, is for clarity only and doesn't otherwise indicate or imply any order in time. For instance, "a first determination," "a second determination," and "a third determination," does not indicate or imply that the first determination is to be made before the second determination, or vice versa, etc.

The description of illustrated embodiments of the subject disclosure as provided herein, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as one skilled in the art can recognize. In this regard, while the subject matter has been described herein in connection with various embodiments and corresponding drawings, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

What is claimed is:

1. A method, comprising:

transmitting, by a first user equipment comprising a processor to a radio access network node, an uplink aggregation request message comprising user equipment access information corresponding to a second user equipment, wherein the first user equipment and the second user equipment are members of an aggregation group of user equipment;

receiving, by the first user equipment from the radio access network node responsive to the uplink aggregation request message, an uplink aggregation grant message comprising first uplink grant information uniquely corresponding to the second user equipment and comprising second uplink grant information uniquely corresponding to at least one other member of the user equipment group other than the first user equipment or the second user equipment; and transmitting, by the first user equipment to the second user equipment, a first uplink grant message comprising the first uplink grant information uniquely corresponding to the second user equipment, wherein the first uplink grant message does not comprise the second uplink grant information.

2. The method of claim 1,
wherein the user equipment access information uniquely corresponding to the second user equipment is first user equipment access information, and wherein the uplink aggregation request message comprises second user equipment access information uniquely corresponding to a third user equipment of the aggregation group of user equipment;
wherein the second uplink grant information uniquely corresponds to the third user equipment; and
wherein the method further comprises:
transmitting, by the first user equipment to the third user equipment, a second uplink grant message comprising the second uplink grant information, wherein the second uplink grant message does not comprise the first uplink grant information.

3. The method of claim 1, wherein the uplink aggregation request message is transmitted by the first user equipment to the radio access network node via an uplink control channel as an uplink control channel information message.

4. The method of claim 1, further comprising:
determining, by the first user equipment, that the uplink aggregation request message is larger than a configured uplink control channel indication criterion,
wherein the uplink aggregation request message is transmitted by the first user equipment to the radio access network node via an uplink data channel based on the uplink aggregation request message being determined to be larger than the configured uplink control channel indication criterion.

5. The method of claim 1, further comprising:
determining, by the first user equipment, a serving beam, corresponding to the first user equipment from multiple available beams, having a highest signal strength at the first user equipment,
wherein the uplink aggregation request message is transmitted via the serving beam corresponding to the first user equipment.

6. The method of claim 1, wherein the uplink aggregation request message comprises a random access preamble corresponding to the first user equipment.

7. The method of claim 1, where the user equipment access information comprises a determined serving downlink beam index, a target service identifier, or a device identifier corresponding to the second user equipment.

8. The method of claim 1, wherein the uplink aggregation grant message comprises third uplink grant information that comprises a first uplink channel resource grant indication indicative of a first uplink channel resource grant to be used by the first user equipment to transmit first uplink data traffic corresponding to the first user equipment and a second uplink channel resource grant indication indicative of a second uplink channel resource grant to be used by the second user equipment to transmit second uplink data traffic corresponding to the second user equipment.

9. The method of claim 1, wherein the first user equipment is a relay user equipment of the aggregation group, wherein the second user equipment is a remote user equipment of the aggregation group, wherein the aggregation group comprises a third user equipment that is a remote user equipment, and wherein the user equipment access information comprises a preamble that indicates to the radio access network node a request that the uplink aggregation grant message comprise the first uplink grant information uniquely corresponding to the second user equipment and second uplink grant information uniquely corresponding to the third user equipment.

10. A relay user equipment, comprising:
a processor configured to:
receive, from a first tethered user equipment tethered to the relay user equipment, first access information corresponding to the first tethered user equipment, wherein the first tethered user equipment is one of multiple tethered user equipment of an aggregation group;
transmit, to a radio access network node, an uplink radio resource connection aggregation request message comprising the first access information, wherein the first access information is to be used to establish a radio resource control connection between the first tethered user equipment and the radio access network node;
receive, from the radio access network node responsive to the uplink radio resource connection aggregation request message, an uplink aggregation grant message comprising first uplink grant information to be used by the first tethered user equipment to transmit first uplink data traffic from the first tethered user equipment to the radio access network node; and
transmit, to the first tethered user equipment, a first uplink grant message comprising the first uplink grant information to be used by the first tethered user equipment to facilitate establishing of the radio resource control connection between the first tethered user equipment and the radio access network node.

11. The relay user equipment of claim 10, wherein the radio resource control connection between the first tethered user equipment and the radio access network node is a first radio resource control connection, and wherein the uplink radio resource connection aggregation request message comprises a preamble to be used to establish a second radio resource control connection between the relay user equipment and the radio access network node.

12. The relay user equipment of claim 10, wherein the radio resource control connection between the first tethered user equipment and the radio access network node is a first radio resource control connection, wherein the relay user equipment and the first tethered user equipment are members of the aggregation group, wherein the uplink radio resource connection aggregation request message comprises relay access information to be used to establish a second radio resource control connection between the relay user equipment and the radio access network node, and wherein the uplink aggregation grant message comprises relay uplink grant information to be used by the relay user equipment to transmit uplink data traffic from the relay user equipment to the radio access network node.

13. The relay user equipment of claim 12, wherein the aggregation group comprises a second tethered user equipment, the processor further configured to:
receive, from the second tethered user equipment, second access information corresponding to the second tethered user equipment;
wherein the uplink radio resource connection aggregation request message comprises the second access information, wherein the second access information is to be used to facilitate establishing a third radio resource control connection between the second tethered user equipment and the radio access network node.

14. The relay user equipment of claim 13, wherein the uplink aggregation grant message comprises second uplink grant information to be used by the second tethered user equipment to transmit second uplink data traffic from the second tethered user equipment to the radio access network node; and wherein the processor is further configured to:

transmit, to the second tethered user equipment, a second uplink grant message comprising the second uplink grant information to be used by the second tethered user equipment to facilitate establishing of the third radio resource control connection.

15. The relay user equipment of claim 13, wherein the uplink aggregation grant message comprises a Null uplink grant indication indicating that the second tethered user equipment has not been granted an uplink resource to transmit uplink data traffic from the second tethered user equipment to the radio access network node; and wherein the processor is further configured to:

transmit, to the second tethered user equipment, a second uplink grant message comprising the Null uplink grant indication.

16. A non-transitory machine-readable medium, comprising executable instructions that, when executed by a processor of a first user equipment, facilitate performance of operations, comprising:

receiving, from a radio access network node, a group access preamble that corresponds to an aggregation group that comprises the first user equipment, a second user equipment, and a third user equipment;

transmitting, to a radio access network node, an uplink radio resource connection request message comprising the group access preamble, first access information to be used to establish a first radio resource control connection between the radio access network node and the second user equipment and second access information to be used to establish a second radio resource control connection between radio access network node and the third user equipment, respectively;

receiving, from the radio access network node responsive to the uplink radio resource connection request message, an uplink grant message comprising first uplink grant information, second uplink grant information, and relay grant information;

transmitting, to the second user equipment, a first uplink grant message comprising the first uplink grant information to facilitate establishing of the first radio resource control connection; and transmitting, to the third user equipment, a second uplink grant message comprising the second uplink grant information to facilitate establishing of the second radio resource control connection.

17. The non-transitory machine-readable medium of claim 16, wherein the first access information comprises at least one of: a first device identifier associated with the second user equipment, a first best-serving downlink beam corresponding to the second user equipment, or a first service identifier corresponding to a first service to be received by the second user equipment from the radio access network node; and wherein the second access information comprises at least one of: a second device identifier associated with the third user equipment, a second best-serving downlink beam corresponding to the third user equipment, or a second service identifier corresponding to a second service to be received by the third user equipment from the radio access network node.

18. The non-transitory machine-readable medium of claim 16, wherein the first uplink grant information comprises at least one of: a first Radio Network Temporary Identifier corresponding to the second user equipment, a first uplink time to be used by the second user equipment transmit uplink data traffic to the radio access network node, a first uplink frequency to be used by the second user equipment transmit uplink data traffic to the radio access network node, or a first uplink power control setting corresponding to a first spectral efficiency of the second user equipment.

19. The non-transitory machine-readable medium of claim 16, wherein the first uplink grant information or the second uplink grant information comprises a Radio Network Temporary Identifier that is a Null indication.

20. The non-transitory machine-readable medium of claim 16, wherein the first user equipment is in a Connected Radio Resource Control state, wherein the second user equipment and the third user equipment are in an Inactive Radio Resource Control state, and wherein the first user equipment transmits the uplink radio resource connection request message via an uplink control channel as an uplink control channel information message.

\* \* \* \* \*